United States Patent
Goektepe et al.

(10) Patent No.: US 12,363,747 B2
(45) Date of Patent: Jul. 15, 2025

(54) USER DEVICE AND METHOD WITH BEAM MANAGEMENT ENHANCEMENTS

(71) Applicant: KONINKLIJKE PHILIPS N.V., Eindhoven (NL)

(72) Inventors: Baris Goektepe, Berlin (DE); Thomas Fehrenbach, Berlin (DE); Cornelius Hellge, Berlin (DE); Thomas Wirth, Berlin (DE); Thomas Schierl, Berlin (DE); Khaled Shawky Hassan Hussein, Erlangen (DE); Martin Leyh, Erlangen (DE); Lars Thiele, Berlin (DE); Martin Kurras, Berlin (DE); Nithin Srinivasan, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 676 days.

(21) Appl. No.: 17/669,187

(22) Filed: Feb. 10, 2022

(65) Prior Publication Data
US 2022/0232580 A1    Jul. 21, 2022

Related U.S. Application Data

(63) Continuation of application No. PCT/EP2020/072733, filed on Aug. 13, 2020.

(30) Foreign Application Priority Data

Aug. 14, 2019 (EP) ..................................... 19191856

(51) Int. Cl.
*H04W 72/12*    (2023.01)
*H04W 72/542*   (2023.01)
(Continued)

(52) U.S. Cl.
CPC ..... *H04W 72/542* (2023.01); *H04W 74/0816* (2013.01)

(58) Field of Classification Search
CPC ........... H04W 72/542; H04W 74/0816; H04W 74/04
See application file for complete search history.

(56) References Cited

U.S. PATENT DOCUMENTS 9,258,811 B2 *  2/2016  Koskela ............. H04W 72/542
9,622,262 B2 *  4/2017  Zhu .................... H04W 74/002
(Continued)

FOREIGN PATENT DOCUMENTS

EP      1526685 A1    4/2005
WO   2015060760 A1    4/2015
(Continued)

OTHER PUBLICATIONS

Cisco, "Cisco Networking—Take your network as seriously as your business", https://www.cisco.com/c/en/us/td/docs/solutions/Enterprise/Mobility/emob41dg/emob41dg-wrapper/ch5_QoS.html*wp1021972, 2022, 2 pp.
(Continued)

*Primary Examiner* — Ahmed Elallam

(57) ABSTRACT

A first transceiver for a wireless communication system according to an embodiment is to determine information on an occupancy of a transmission channel. Moreover, the first transceiver is to transmit the information on the occupancy of the transmission channel to a second transceiver. Furthermore, the first transceiver is to determine the information on the occupancy of the transmission channel and to transmit the information on the occupancy of the transmission channel to the second transceiver without having received from the second transceiver a ready-to-transmit message with
(Continued)

which the second transceiver would inform the first transceiver that the second transceiver intends to transmit user data to the first transceiver.

16 Claims, 12 Drawing Sheets

(51) Int. Cl.
  *H04W 74/08* (2024.01)
  *H04W 74/0816* (2024.01)

(56) References Cited

U.S. PATENT DOCUMENTS

| | | | | |
|---|---|---|---|---|
| 10,582,484 | B2* | 3/2020 | Yi | H04W 4/06 |
| 10,856,164 | B2* | 12/2020 | Zhou | H04L 5/006 |
| 11,006,390 | B2* | 5/2021 | Moon | H04W 74/0808 |
| 11,497,056 | B2* | 11/2022 | Goyal | H04B 7/0695 |
| 11,546,940 | B2 | 1/2023 | Hedayat et al. | |
| 2017/0013479 | A1* | 1/2017 | Sun | H04L 27/2601 |
| 2021/0368541 | A1* | 11/2021 | Hedayat | H04L 5/005 |
| 2022/0150968 | A1* | 5/2022 | Fehrenbach | H04W 72/23 |
| 2023/0413317 | A1* | 12/2023 | Mukherjee | H04W 74/004 |

FOREIGN PATENT DOCUMENTS

| | | |
|---|---|---|
| WO | 2017007579 A1 | 1/2017 |
| WO | 2019140060 A1 | 7/2019 |

OTHER PUBLICATIONS

ETSI "5 Ghz RLAN; Harmonised Standard covering the essential requirements of article 3.2 of Directive 2014/53/EU", EN 301 893 V2.1.1 (May 2017), May 2017, 122 pp.

ETSI, "5 Ghz RLAN; Harmonised Standard covering the essential requirements of article 3.2 of Directive 2014/53/EU", EN 301 893 V2.0.7 section 4.2.7.3.2.5 (Nov. 2016), Nov. 2016, 123 pp.

ETSI, "Multiple-Gigabit/s radio equipment operating in the 60 GHz band; Harmonised Standard covering the essential requirements of article 3.2 of Directive 2014/53/EU", EN 302 567 V2.0.22 (Draft), Dec. 2016, 39 pp.

Garcia-Luna-Aceves, J.J., et al., "The effect of exerting adequate persistence in collision avoidance protocols", Mobile Multimedia Communications, 1999. (MOMUC '99). 1999 IEEE International Workshop on San Diego, CA, USA Nov. 15-17, 1999, XP013070733, pp. 328-337.

Lagen, Sandra, et al., "Listen Before Receive for Coexistence in Unlicensed mmWave Bands", Conference Paper, 7 pp.

Sony, "Channel access for NR unlicensed operations", 3GPP TSG RAN WG1 #96bis, R1-1906834, Reno, USA, May 13-17, 2019, May 13, 2019, 5 pp.

ZTE, et al., "Discussion on channel access procedure for NR-U", 3GPP TSG RAN WG1 Meeting #97, R1-1905951, Reno, USA, May 13-17, 2019, May 13, 2019, 12 pp.

IEEE, "[Uploaded in 2 parts] Part 11: Wireless LAN Medium Access Control (MAC) and Physical Layer (PHY) specification", IEEE 802.11. = Standard, 1997, 284 pp.

Ilmenau University of Technology, "Characteristics of Wireless LANs", https://www.tu-ilmenau.de/fileadmin/public/iks/files/lehre/mobicom/AN-10-IEEE_802_11.pdf, Dec. 2016, 35 pp.

Lopéz-Pérez, David, et al., "IEEE 802.11be—Extremely High Throughput: The Next Generation of Wi-Fi Technology Beyond 802.11ax", arXiv:1902.04320v1 [cs.IT] Feb. 12, 2019, 7 pp.

Dahlman Erik et al: "4G: LTE/LTE-Advanced for Mobile Broadband—Chapter 13—Scheduling and Rate Adaptation", 4G L TE/ L TE-Advanced for Mobile Broadband, Oct. 29, 2013 (Oct. 29, 2013), pp. 321-346, XP093050297, Burlington ISBN: 978-0-12-419985-9 Retrieved from the Internet: URL:https://ebookcentral.proquest.com/lib/epo-ebooks/ reader.action?docID=1463422 [retrieved on May 30, 2023].

Xiaoxiao Zhuo et al: "Time-based adaptive collision-avoidance real-time MAC protocol for underwater acoustic sensor networks", Underwater Networks & Systems, ACM, 2 Penn Plaza, Suite 701 New YORKNY10121-0701 USA, Dec. 3, 2018 (Dec. 3, 2018), pp. 1-5, XP058423309, DOI:10.1145/3291940.3291991 ISBN: 978-1-4503-6193-4.

* cited by examiner

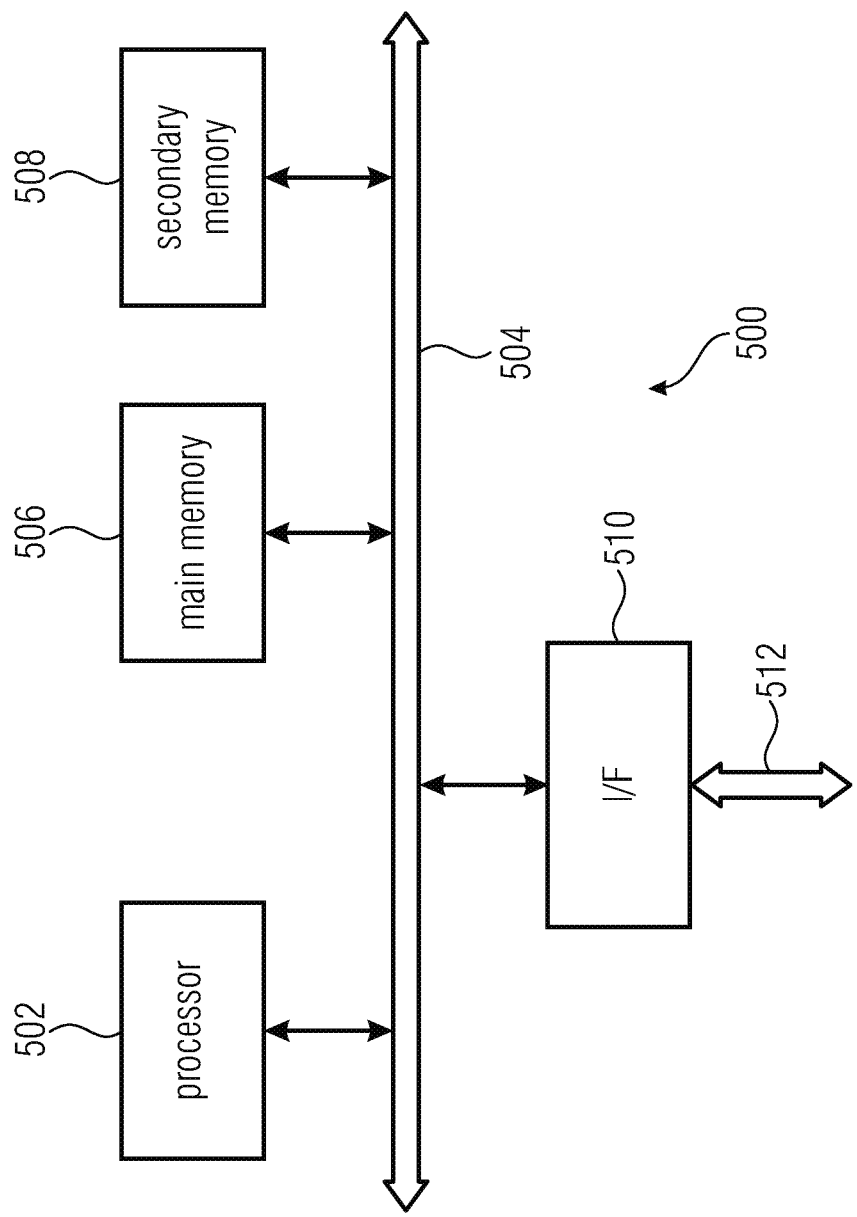

USER DEVICE AND METHOD WITH BEAM MANAGEMENT ENHANCEMENTS

CROSS-REFERENCES TO RELATED APPLICATIONS

This application is a continuation of copending International Application No. PCT/EP2020/072733, filed Aug. 13, 2020, which is incorporated herein by reference in its entirety, and additionally claims priority from European Application No. EP 19191856.4, filed Aug. 14, 2019, which is incorporated herein by reference in its entirety.

The present application concerns the field of wireless communication systems or networks, more specifically, enhancements or improvements in the communication among entities of the wireless communication network. Embodiments concern enhancements or improvements for beam management for NR-U (New Radio in Unlicensed Spectrum) and Wireless LAN IEEE 802.11.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, ... $RAN_N$. FIG. 1(b) is a schematic representation of an example of a radio access network $RAN_D$ that may include one or more base stations $gNB_1$ to $gNB_5$, each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards, e.g. an access point (AP). A user may be a stationary device or a mobile device or a user equipment (UE) or a station (STA). The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure.

FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NU-U, New Radio Unlicensed, standard, or the 802.11ax, or the 802.11be.rules The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using one of more frequency bands. A frequency band includes a start frequency, an end frequency and all intermediate frequencies between the start and end frequencies. In other words, the start, end and intermediate frequencies may define a certain bandwidth, e.g., 20 MHz. A frequency band may also be referred to as a carrier, a bandwidth part, BWP, a subband, and the like.

When using a single frequency band, the communication may be referred to as a single-band operation, e.g., a UE transmits/receives radio signals to/from another network entity on frequencies being within the 20 MHz band.

When using a two or more frequency bands, the communication may be referred to as a multi-band operation or as a wideband operation or as a carrier aggregation operation. The frequency bands may have different bandwidths or the same bandwidth, like 20 MHz. For example, in case of frequency bands having the same bandwidths a UE may transmit/receive radio signals to/from another network entity on frequencies being within two or more of the 20 MHz bands so that the frequency range for the radio communication may be a multiple of 20 MHz. The two or more frequency bands may be continuous/adjacent frequency bands or some or all for the frequency bands may be separated in the frequency domain.

The multi-band operation may include frequency bands in the licensed spectrum, or frequency bands in the unlicensed spectrum, or frequency bands both in the licensed spectrum and in the unlicensed spectrum.

Carrier aggregation, CA, is an example using two or more frequency bands in the licensed spectrum and/or in the unlicensed spectrum.

5G New Radio (NR) may support an operation in the unlicensed spectrum so that a multi-band operation may include frequency bands in the unlicensed spectrum bands. This may be as NR-based access to unlicensed spectrum, NR-U, and the frequency bands may be referred to as subbands. The unlicensed spectrum may include bands with a potential IEEE 802.11 coexistence, such as the 5 GHz and the 6 GHz bands. NR-U may support bandwidths that are an integer multiple of 20 MHz, for example due to regulatory requirements. The splitting into the subbands is performed so as to minimize interference with coexisting systems, like IEE 802.11 systems, which may operate in one or more of the same bands with the same nominal bandwidth channels, like 20 MHz channels. Other examples, of coexisting systems may use subbands having subband sizes and nominal frequencies different from the above-described IEEE 802.11 systems. For example, the unlicensed spectrum may include the 5 GHz band, the 6 GHz band, the 24 GHz band or the 60 GHz band. Examples of such unlicensed bands include the industrial, scientific and medical, ISM, radio bands reserved internationally for the use of radio frequency energy for industrial, scientific and medical purposes other than telecommunications.

During an operation using unlicensed subbands, Listen-before-talk, LBT, is to be performed separately per subband. This may lead to a situation in which one or more of the subbands are busy or occupied due to an interference, for example, from other communication systems coexisting on the same band, like other public land mobile networks, PLMNs or systems operating in accordance with the IEEE 802.11 specification. In such a situation, the transmitter, either the transmitting gNB or the transmitting UE, is only allowed to transmit on the subbands which are detected to be not busy, also referred to as subbands being free or non-occupied, as is determined by the LBT algorithm. For example for a transmission spanning more than 20 MHz in the 5 GHz operational unlicensed band, the transmitter, like the gNB or the UE, performs Listen-Before-Talk, LBT, separately on each subband. Once the LBT results are available for each subband, the devices, for example, the gNB in the downlink, DL, or the UE in the uplink, UL, are allowed to transmit on those subbands which are determined to be free or unoccupied, i.e., to transmit on the won subband(s). No transmission is allowed on the occupied, busy or non-won subbands.

It is noted that the information in the above section is only for enhancing the understanding of the background of the invention and therefore it may contain information that does not form conventional technology that is already known to a person of ordinary skill in the art.

SUMMARY

An embodiment may have a first transceiver for a wireless communication system, wherein the first transceiver is to determine information on an occupancy of a transmission channel, wherein the first transceiver is to transmit the information on the occupancy of the transmission channel to a second transceiver, wherein the first transceiver is to determine the information on the occupancy of the transmission channel and to transmit the information on the occupancy of the transmission channel to the second transceiver without having received from the second transceiver a ready-to-transmit message with which the second transceiver would inform the first transceiver that the second transceiver intends to transmit user data to the first transceiver.

Another embodiment may have a first transceiver for a wireless communication system, wherein the first transceiver is a base station, wherein the first transceiver is to determine information on an occupancy of a transmission channel, wherein the first transceiver is to transmit the information of the occupancy of the transmission channel to a second transceiver, wherein the second transceiver is a user device, wherein the first transceiver is to not receive information on an occupancy of another transmission channel from the second transceiver.

Yet another embodiment may have an apparatus for interference control for a wireless communication system, wherein the apparatus for interference control is for receiving information on a plurality of transmissions of a plurality of transceivers in the wireless communication system, wherein the apparatus for interference control is for scheduling the plurality of transmissions of the plurality of transceivers in the wireless communication system to avoid an interference of a first one of the plurality of transmissions with a second one of the plurality of transmissions.

Still another embodiment may have a transceiver for a wireless communication system, wherein the second transceiver is to not transmit a ready-to-transmit message from the second transceiver with which the second transceiver would inform the first transceiver that the second transceiver intends to transmit user data to the first transceiver, wherein the second transceiver is to receive information on an occupancy of a transmission channel from the first transceiver.

An embodiment may have a second transceiver for a wireless communication system, wherein the second transceiver is a user device, wherein the second transceiver is to receive information on an occupancy of a transmission channel from a first transceiver, the first transceiver being a base station, wherein the second transceiver is to not send information on an occupancy of another transmission channel to the first transceiver.

Another embodiment may have a transceiver for a wireless communication system, the transceiver being one of a plurality of transceivers, wherein the transceiver is to transmit information on a transmission of the transceiver within the wireless network to an apparatus for interference control, the transmission of the transceiver being one of a plurality of transmissions of the plurality of transceivers in the wireless communication system, wherein the transceiver is to receive instructions from the apparatus for interference control on a scheduling of the transmission of transceiver within the wireless network, wherein the transceiver is to adapt the transmission within the wireless network in response to receiving the instructions from the apparatus for interference control on the scheduling of the transmission of transceiver within the wireless network.

According to an embodiment, a wireless communication system may have: the first inventive transceiver and the second inventive transceiver in any combination.

According to another embodiment, a wireless communication system may have: the inventive apparatus for interference control, and two or more transceivers, wherein each of the two or more transceivers is an inventive transceiver, and may have any combination of said apparatus and said transceivers.

According to another embodiment, a method for operating a wireless communication system may have the steps of: determining, by a first transceiver, information on an occupancy of a transmission channel, transmitting, by the first transceiver, the information on the occupancy of the transmission channel to a second transceiver, wherein the determining of the information on the occupancy of the transmission channel and the transmitting of the information on the occupancy of the transmission channel to the second transceiver is conducted by the first transceiver without having received from the second transceiver a ready-to-transmit message with which the second transceiver would inform the first transceiver that the second transceiver intends to transmit user data to the first transceiver.

According to yet another embodiment, a method for operating a wireless communication system may have the steps of: determining, by a base station, information on an occupancy of a transmission channel, transmitting, by the base station, the information on the occupancy of the transmission channel to a user device, wherein the base station does not receive information on an occupancy of another transmission channel from the user device.

According to still another embodiment, a method for operating a wireless communication system may have the steps of: an apparatus for interference control receives information on a plurality of transmissions of a plurality of transceivers in the wireless communication system, scheduling, by the apparatus for interference control, the plurality of transmissions of the plurality of transceivers in the wireless communication system to avoid an interference of a first one of the plurality of transmissions with a second one of the plurality of transmissions.

According to an embodiment, a method for operating a wireless communication system may have the steps of: not transmitting a ready-to-transmit message from a second transceiver to a first transceiver with which the second transceiver would inform the first transceiver that the second transceiver intends to transmit user data to the first transceiver, receiving information from the first transceiver at the second transceiver on an occupancy of a transmission channel.

According to another embodiment, a method for operating a wireless communication system may have the steps of: receiving information from a base station at a user device on an occupancy of a transmission channel, wherein the user device is to not send information on an occupancy of another transmission channel to the base station.

According to yet another embodiment, a method for operating a wireless communication system may have the steps of: transmitting, from a transceiver to an apparatus for interference control, information on a transmission of the transceiver within the wireless network, the transmission of the transceiver being one of a plurality of transmissions of the plurality of transceivers in the wireless communication system, receiving instructions from the apparatus for interference control at the transceiver on a scheduling of the transmission of transceiver within the wireless network, adapting the transmission within the wireless network by the transceiver in response to receiving the instructions from the apparatus for interference control on the scheduling of the transmission of transceiver within the wireless network.

According to yet another embodiment, a non-transitory digital storage medium may have a computer program stored thereon to perform the inventive methods, when said computer program is run by a computer.

In the future Release, NR-U is expected to be extended high frequency bands in FR2, e.g. to the 60 GHz band. At these high frequencies, transmissions using narrow beams become mandatory due to the high propagation losses. However, this increases the hidden node problem significantly under which Listen-before-Talk (LBT) systems suffer in general.

The state-of-the-art is the LBT procedure as used in NR-U and as obliged by ETSI BRAN EN 301.893. In these, only the transmitter device performs an LBT procedure and decides whether to transmit or not based on the outcome of this procedure.

An LBT procedure exists.

IEEE 802.11 systems sent frames using the Distributed Coordination Function (DCF). This is composed of interframe spaces (IFS) and a random backoff (contention window) as depicted below.

If a UE that is currently sensing receives a data packet, it reads the network allocation vector (NAV) from the ongoing transmission and defers its backoff procedure until the transmission has finished.

FIG. 3 illustrates DFS, in particular, interframe spaces, backoff window, contention window as used by the CSMA/CA algorithm of IEEE 802.11 systems, FIG. 4 illustrates rules for Load Based Equipment (LBE) in EU.

In the bands with potential IEEE 802.11 coexistence, such as the 5 GHz and potentially also the 6 GHz bands, NR-U only supports bandwidths that are an integer multiple of 20 MHz due to regulatory requirements. Each of these 20 MHz bandwidth channels is designated as subband. The splitting into subbands is performed to minimize interference with IEEE 802.11 systems, which might operate in the same bands with the same nominal bandwidth channels (i.e., 20 MHz). In unlicensed frequency bands other than the 5 GHz band, e.g. 24 GHz, the subband size and the nominal frequency might differ. In wideband operation (e.g. >20 MHz for the 5 GHz operational unlicensed band), the gNB and the UE have to perform LBT separately on each subband. Once the LBT results are available from each subband, the devices (gNB in DL and UE in UL) are only allowed to transmit on the subbands sensed to be unoccupied (=no LBT failure). See FIG. 5 for more details about LBT in a wide-band operation. The number of 20 MHz subbands in the 5 GHz unlicensed band is identified to be e.g. 4 (i.e. 80 MHz). The number of subbands in other unlicensed frequency bands may differ.

FIG. 5 illustrates a wideband operation for NR-U. The LBT Schemes in 3GPP RAN are Classified into 4 Different Categories:
Category 1: No LBT
Category 2: LBT without random back-off
Category 3: LBT with random back-off with fixed size of contention window
Category 4: LBT with random back-off with variable size of contention window For initiating a Channel Occupancy Time (COT) within a supported/configured Bandwidth Part (BWP), the gNB and UE has to perform a CAT-4 LBT (with random backoff and variable contention window size (CWS)). Within a gNB-initiated COT, the UEs use a CAT-2 LBT (without random backoff and fixed CWS) procedure to transmit a PUCCH or PUSCH. Similarly, for a UE initiated COT using CAT-4 LBT, it is discussed that the gNB may use CAT-2 LBT for transmitting within a UE-initiated COT. In this case, the UE may indicate the maximum time the gNB is supposed to transmit within its COT.

CAT 4 LBT is recommended for PDSCH transmission

FIG. 6 illustrates Cat 4 LBT with DRS bursts [R1-1905951].

The LBT mechanism is as follows [ETSI EN 302 567 V2.0.22]:
1. Before a transmission or a burst of transmissions on an Operating Channel, the equipment shall perform a Clear Channel Assessment (CCA) check using "energy detect". The equipment shall observe the Operating Channel(s) for the duration of the CCA observation time measured by multiple CCA slot times of 5 μs. The Operating Channel shall be considered occupied for a slot time if the energy level in the channel exceeds the threshold corresponding to the power level given in step 5) below.
2. Extended CCA Check definition:
   a. An extended CCA check is initiated at end of operating channel occupied.
   b. The transmission shall not start earlier than 8 μs while observing CCA empty.
   c. The transmission deferring continues for a random number of empty slots period.
   d. Random number: ranges from zero to a Max number not greater than 127.
   e. Extended CCA Check Time equals b)+c), i.e. 8 μs+random (0 to 127)×5 μs.
3. The equipment shall perform an Extended CCA Check in the Operating Channel. If the equipment finds an Operating Channel occupied, it shall not transmit in that channel. If the extended CCA check has determined the channel to be no longer occupied for the entire Extended CCA Check Time, the equipment may resume transmissions on this channel.
4. The total time that an equipment makes use of an Operating Channel is defined as the Channel Occupancy Time. This Channel Occupancy Time shall be less than 9 ms, after which the device shall perform a new CCA as described in step 1) and step 2) above.
5. The equipment, upon correct reception of a packet which was intended for this equipment, can skip CCA and immediately proceed with the transmission in response to received frames. A consecutive sequence of transmissions by the equipment, without a new CCA, shall be less than or equal to the Maximum Channel Occupancy Time as defined in step 3) above.
6. The energy detection threshold for the CCA shall be −47 dBm+(40 dBm−Pout (dBm)) assuming 0 dBi antenna gain. Similar definitions are given for 5 GHz in [ETSI EN 301 893 V2.0.7 section 4.2.7.3.2.5]. Pout is the maximum transmit power of the same device, performing the LBT.

Another technique is receiver-assisted LBT.

Furthermore, InterDigital® has proposed a receiver-assisted LBT procedure as described in [1]. Here, the transmitter device performs the initial LBT to transmit a Ready-to-Transmit (RtoTx) signal. The receiver device also performs an LBT in response to receiving the RtoTx message and transmits a Ready-to-Receive (RtoRx) message, if the LBT succeeds. Only if the transmitter device receives this message, it performs again an LBT procedure and starts data transmission in case of success.

FIG. 7 and FIG. 8 illustrates an LBR procedure as proposed in [1].

In particular, FIG. 7 illustrates LBR to complement LBT with the self-contained slot for DL-only.

Moreover, FIG. 8 illustrates LBR to complement LBT with the self-contained slot for UL-only.

A similar mechanism called RTS/CTS (Request to Send/ Clear to Send) is an optional mechanism available in 802.11 systems to overcome the hidden node problem. The mechanism itself introduced latency and overhead can often be greater than the cost, particular for short data packets.

Starting from conventional technology as described above, there may be a need for improvements for the devices and for methods in a wireless communication system.

A first transceiver for a wireless communication system according to an embodiment is provided. The first transceiver is to determine information on an occupancy of a transmission channel. Moreover, the first transceiver is to transmit the information on the occupancy of the transmission channel to a second transceiver. Furthermore, the first transceiver is to determine the information on the occupancy of the transmission channel and to transmit the information on the occupancy of the transmission channel to the second transceiver without having received from the second transceiver a ready-to-transmit message with which the second transceiver would inform the first transceiver that the second transceiver intends to transmit user data to the first transceiver, (for example, on a resource scheduled by a BS or an AP, wherein the first or the second transceiver may be the BS or AP).

Since transmissions have been scheduled now, there is no need for a ready-to-transmit signal to indicate the start of a transmission.

Moreover, a first transceiver for a wireless communication system according to another embodiment is provided. The first transceiver is a base station. The first transceiver is to determine information on an occupancy of a transmission channel. Furthermore, the first transceiver is to transmit the information of the occupancy of the transmission channel to a second transceiver, wherein the second transceiver is a user device. The base station is to not receive information on an occupancy of another transmission channel from the user device.

Furthermore, an apparatus for interference control for a wireless communication system according to an embodiment is provided. The apparatus for interference control is for receiving information on a plurality of transmissions of a plurality of transceivers in the wireless communication system. Moreover, the apparatus for interference control is for scheduling the plurality of transmissions of the plurality of transceivers in the wireless communication system to avoid an interference of a first one of the plurality of transmissions with a second one of the plurality of transmissions.

Moreover, a second transceiver for a wireless communication system according to an embodiment is provided. The second transceiver is to not transmit a ready-to-transmit message from the second transceiver with which the second transceiver would inform the first transceiver that the second transceiver intends to transmit user data to the first transceiver. Furthermore, the second transceiver is to receive information on an occupancy of a transmission channel from the first transceiver (for example, on a resource scheduled by a BS or an AP, wherein the first or the second transceiver may be the BS or AP).

Furthermore, a second transceiver for a wireless communication system according to an embodiment is provided. The second transceiver is a user device. The second transceiver is to receive information on an occupancy of a transmission channel from a first transceiver, the first transceiver being a base station. The user device is to not send information on an occupancy of another transmission channel to the base station.

Moreover, a transceiver for a wireless communication system according to another embodiment is provided. The transceiver is one of a plurality of transceivers. The transceiver is to transmit information on a transmission of the transceiver within the wireless network to an apparatus for interference control, the transmission of the transceiver being one of a plurality of transmissions of the plurality of transceivers in the wireless communication system. Moreover, the transceiver is to receive instructions from the apparatus for interference control on a scheduling of the transmission of transceiver within the wireless network. Furthermore, the transceiver is to adapt the transmission within the wireless network in response to receiving the instructions from the apparatus for interference control on the scheduling of the transmission of transceiver within the wireless network.

Moreover, a wireless communication system according to an embodiment is provided. The wireless communication system comprises the first transceiver as described above and the second transceiver as described above.

Furthermore, a wireless communication system according to another embodiment is provided. The wireless communication system comprises the apparatus for interference control as described above and two or more transceivers, wherein each of the two or more transceivers is a transceiver as described above.

Moreover, a method for operating a wireless communication system according to an embodiment is provided. The method comprises:

Determining, by a first transceiver, information on an occupancy of a transmission channel. And:

Transmitting, by the first transceiver, the information on the occupancy of the transmission channel to a second transceiver.

The determining of the information on the occupancy of the transmission channel and the transmitting of the information on the occupancy of the transmission channel to the second transceiver is conducted by the first transceiver without having received from the second transceiver a ready-to-transmit message with which the second transceiver would inform the first transceiver that the second transceiver intends to transmit user data to the first transceiver.

Furthermore, a method for operating a wireless communication system according to an embodiment is provided. The method comprises:

Determining, by a base station, information on an occupancy of a transmission channel. And:

Transmitting, by the base station, the information on the occupancy of the transmission channel to a user device.

The base station does not receive information on an occupancy of another transmission channel from the user device.

Moreover, a method for operating a wireless communication system according to an embodiment is provided. The method comprises:

An apparatus for interference control receives information on a plurality of transmissions of a plurality of transceivers in the wireless communication system.

Scheduling, by the apparatus for interference control, the plurality of transmissions of the plurality of transceivers in the wireless communication system to avoid an interference of a first one of the plurality of transmissions with a second one of the plurality of transmissions.

Furthermore, a method for operating a wireless communication system according to another embodiment is provided. The method comprises:

Not transmitting a ready-to-transmit message from a second transceiver to a first transceiver with which the second transceiver would inform the first transceiver that the second transceiver intends to transmit user data to the first transceiver.

Receiving information from the first transceiver at the second transceiver on an occupancy of a transmission channel.

Moreover, a method for operating a wireless communication system according to an embodiment is provided. The method comprises:

Receiving information from a base station at a user device on an occupancy of a transmission channel.

The user device is to not send information on an occupancy of another transmission channel to the base station.

Furthermore, a method for operating a wireless communication system according to another embodiment is provided. The method comprises:

Transmitting, from a transceiver to an apparatus for interference control, information on a transmission of the transceiver within the wireless network, the transmission of the transceiver being one of a plurality of transmissions of the plurality of transceivers in the wireless communication system.

Receiving instructions from the apparatus for interference control at the transceiver on a scheduling of the transmission of transceiver within the wireless network.

Adapting the transmission within the wireless network by the transceiver in response to receiving the instructions from the apparatus for interference control on the scheduling of the transmission of transceiver within the wireless network.

For example, a transceiver, e.g. BS or Access Point (AP), may also report for other transceivers, e.g. connected UEs/STAs.

Moreover, in embodiments, a computer program product comprising instructions which, when the program is executed by a computer, causes the computer to carry out the one or more above-described methods is provided.

BRIEF DESCRIPTION OF THE DRAWINGS

Embodiments of the present invention will be detailed subsequently referring to the appended drawings, in which:

FIG. 13 illustrates an example of a computer system on which units or modules as well as the steps of the methods described in accordance with the inventive approach may execute.

DETAILED DESCRIPTION OF THE INVENTION

Embodiments of the present invention are now described in more detail with reference to the accompanying drawings in which the same or similar elements have the same reference signs assigned.

Figure 1A:
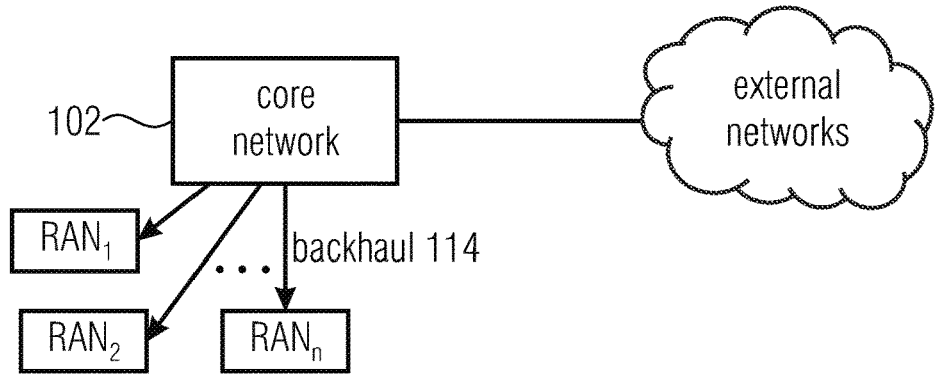
FIG. 1a-b illustrates a schematic representation of an example of a wireless communication system.
Figure 1B:
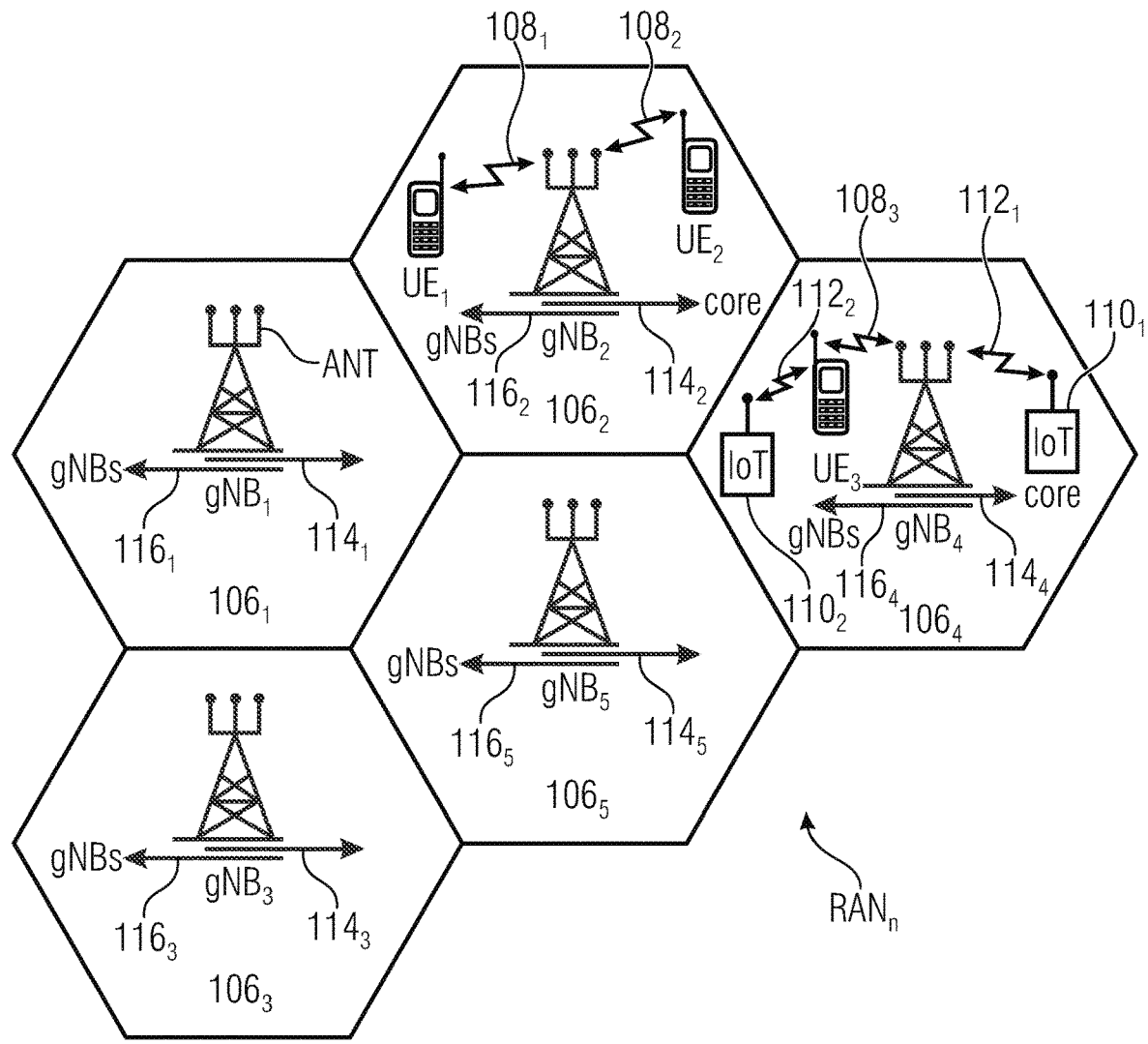
Figure 2:
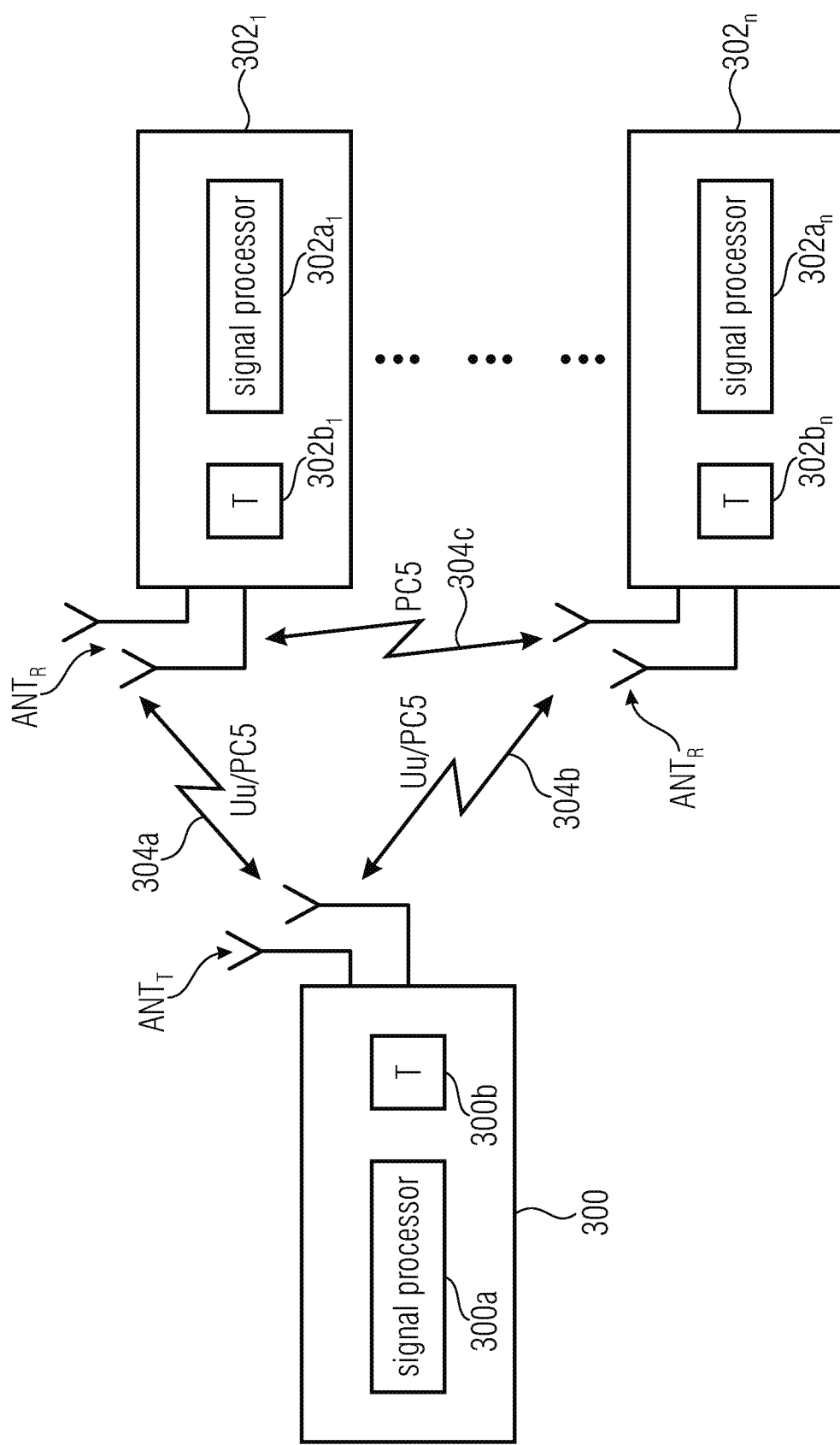
FIG. 2 illustrates a schematic representation of a wireless communication system including a transceiver, like a base station, and one or more transceivers, like user devices, UEs.
Figure 3:
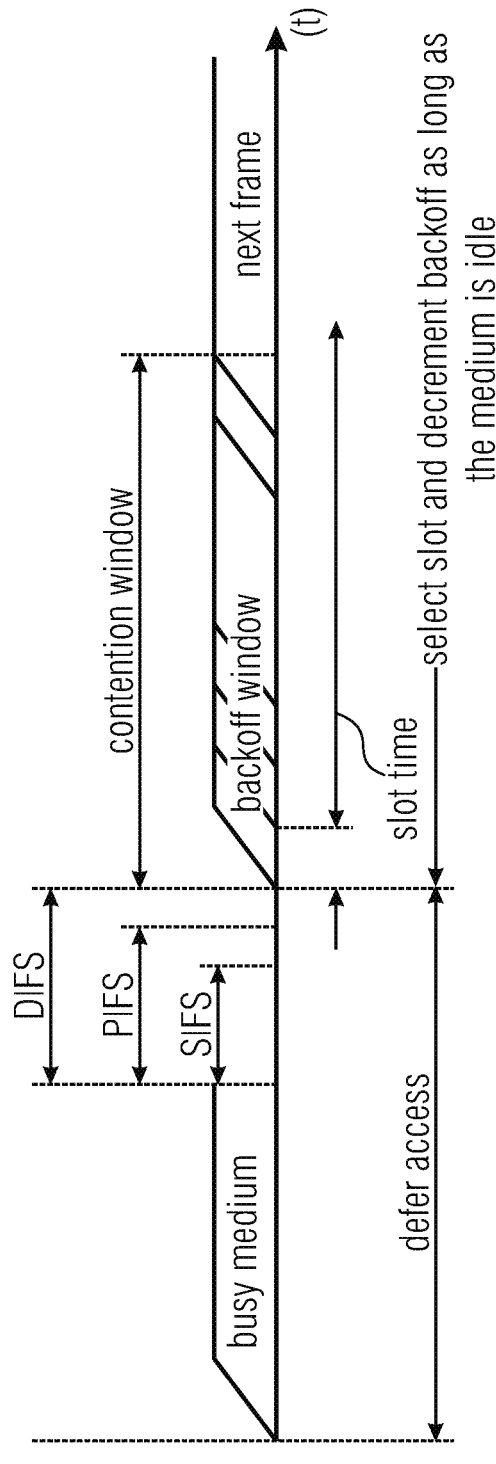
FIG. 3 illustrates DFS, in particular, interframe spaces, backoff window, contention window as used by the CSMA/CA algorithm of IEEE 802.11 systems.
Figure 4:
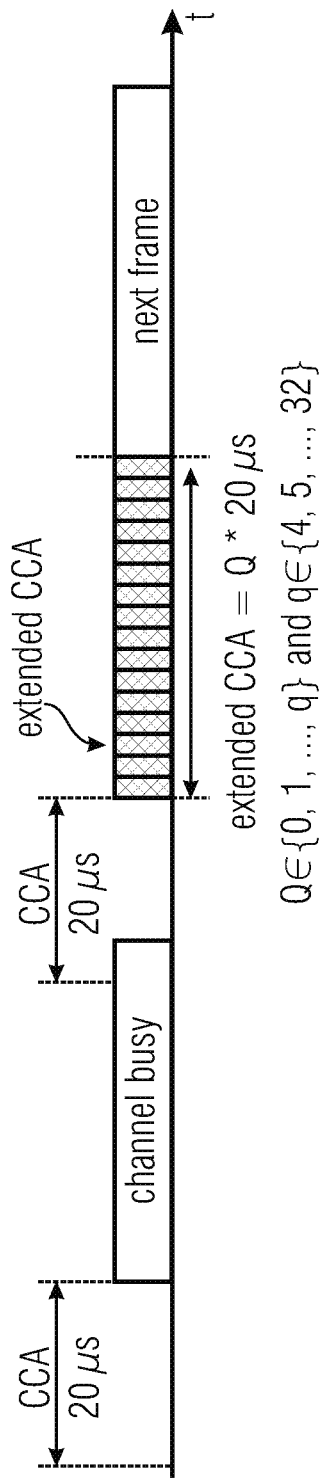
FIG. 4 illustrates rules for Load Based Equipment in EU.
Figure 5B:
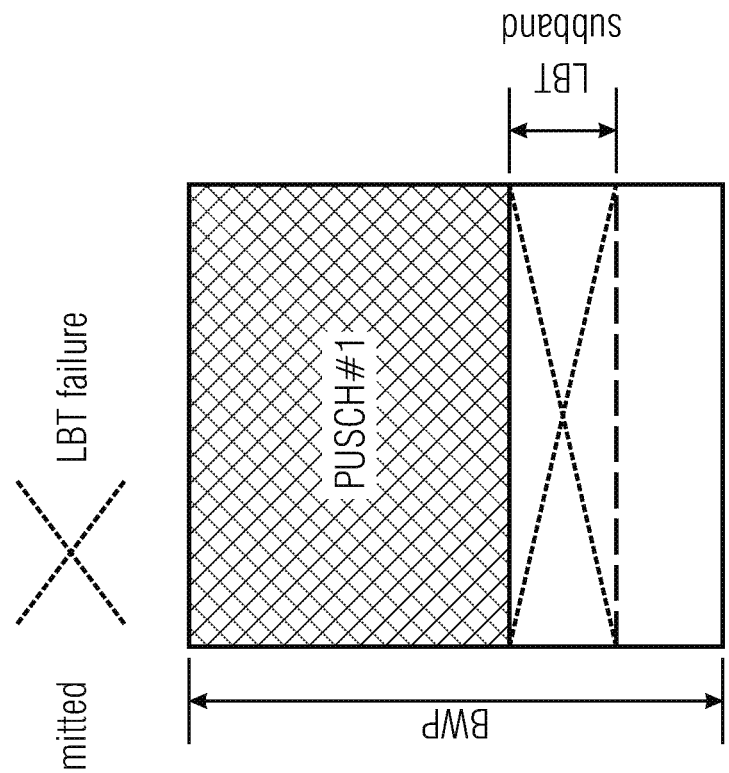
FIG. 5a-b illustrates a wideband operation for NR-U.
Figure 5A:
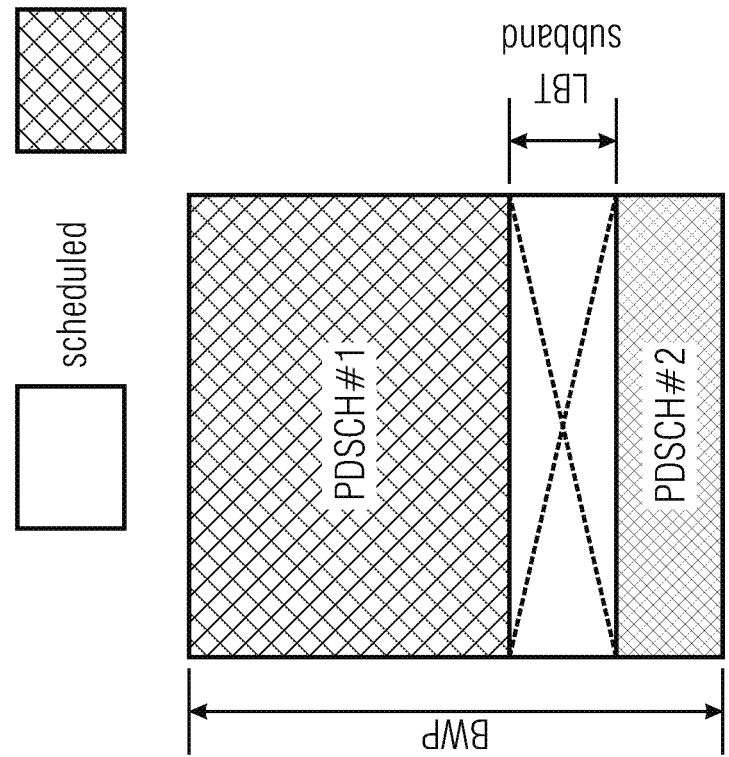
Figure 6:
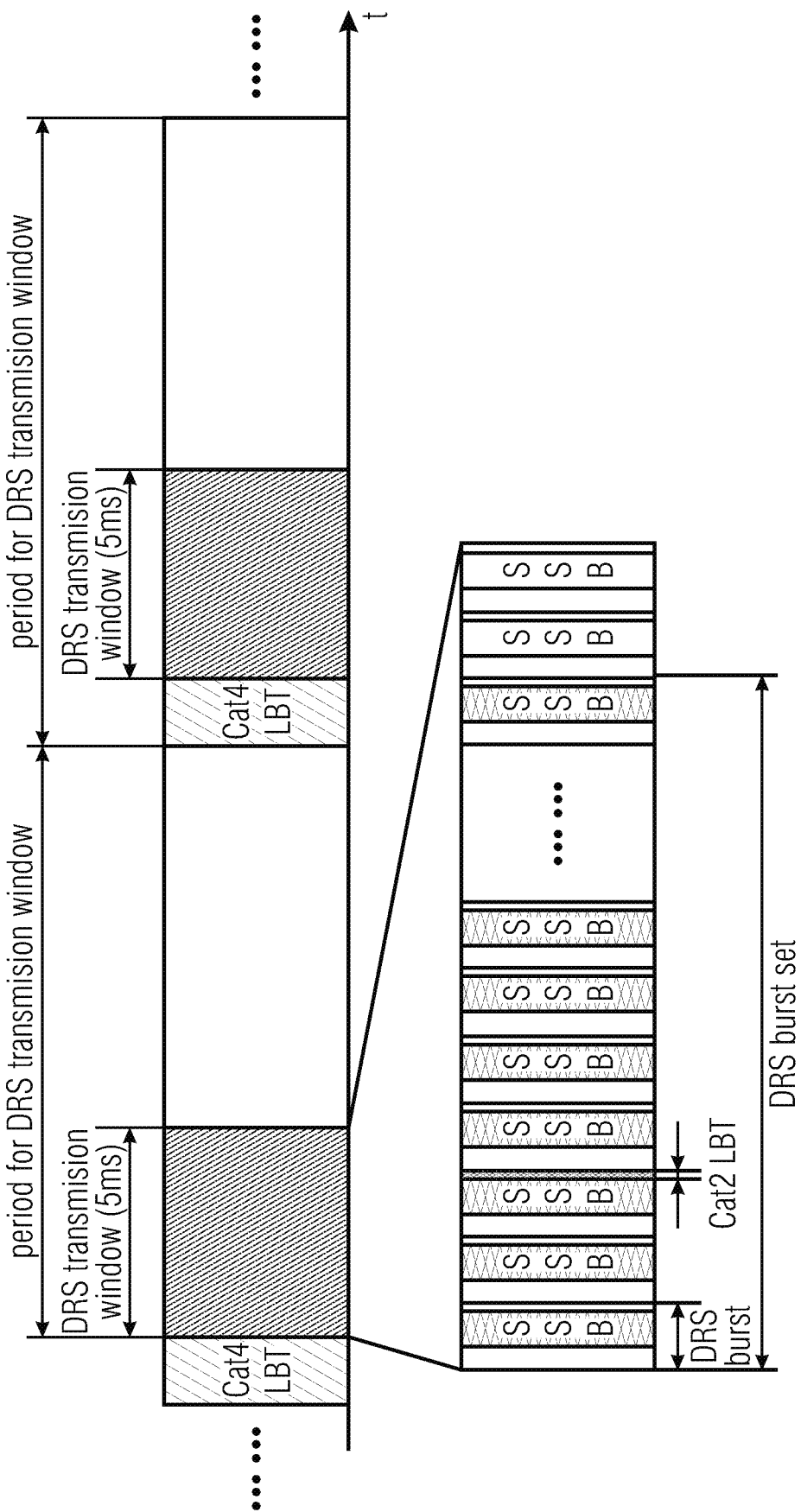
FIG. 6 illustrates Cat 4 LBT with DRS bursts.

Embodiments of the present invention may be implemented in a wireless communication system as depicted in FIG. 1 including base stations and users, like mobile terminals or IoT devices. FIG. 2 is a schematic representation of a wireless communication system including a transceiver 300, like a base station, and one or more other transceivers $302_1$ to $302_n$, like user devices, UEs. The transceiver 300, for example, a base station, and the (one or more) other transceivers 302, for example, (one or more) user devices, UE, may communicate via one or more wireless communication links or channels 304a, 304b, 304c, like a radio link. The transceiver 300, for example, the base station, may include one or more antennas $ANT_T$ or an antenna array having a plurality of antenna elements, a signal processor 300a and a transceiver unit 300b, coupled with each other. The (one or more) other transceivers 302, for example, the (one or more) user devices, UE, include one or more antennas $ANT_R$ or an antenna array having a plurality of antennas, a signal processor $302a_1$, $302a_n$, and a transceiver unit $302b_1$, $302b_n$, coupled with each other. The transceiver 300, e.g., the base station, and the (one or more) other transceivers, e.g., the (one or more) user devices UEs 302 may communicate via respective first wireless communication links 304a and 304b, like a radio link using the Uu interface, while the UEs 302 may communicate with each other via a second wireless communication link 304c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, e.g., the one or more UEs 302 and, e.g., the base stations 300 may operate in accordance with the inventive teachings described herein.

In an embodiment, a first transceiver for a wireless communication system according to an embodiment is provided.

The first transceiver determines information on an occupancy of a transmission channel.

The first transceiver transmits the information on the occupancy of the transmission channel to a second transceiver.

The first transceiver determine the information on the occupancy of the transmission channel and to transmit the information on the occupancy of the transmission channel to the second transceiver without having received from the second transceiver a ready-to-transmit message with which the second transceiver would inform the first transceiver that the second transceiver intends to transmit user data to the first transceiver.

Figure 7:
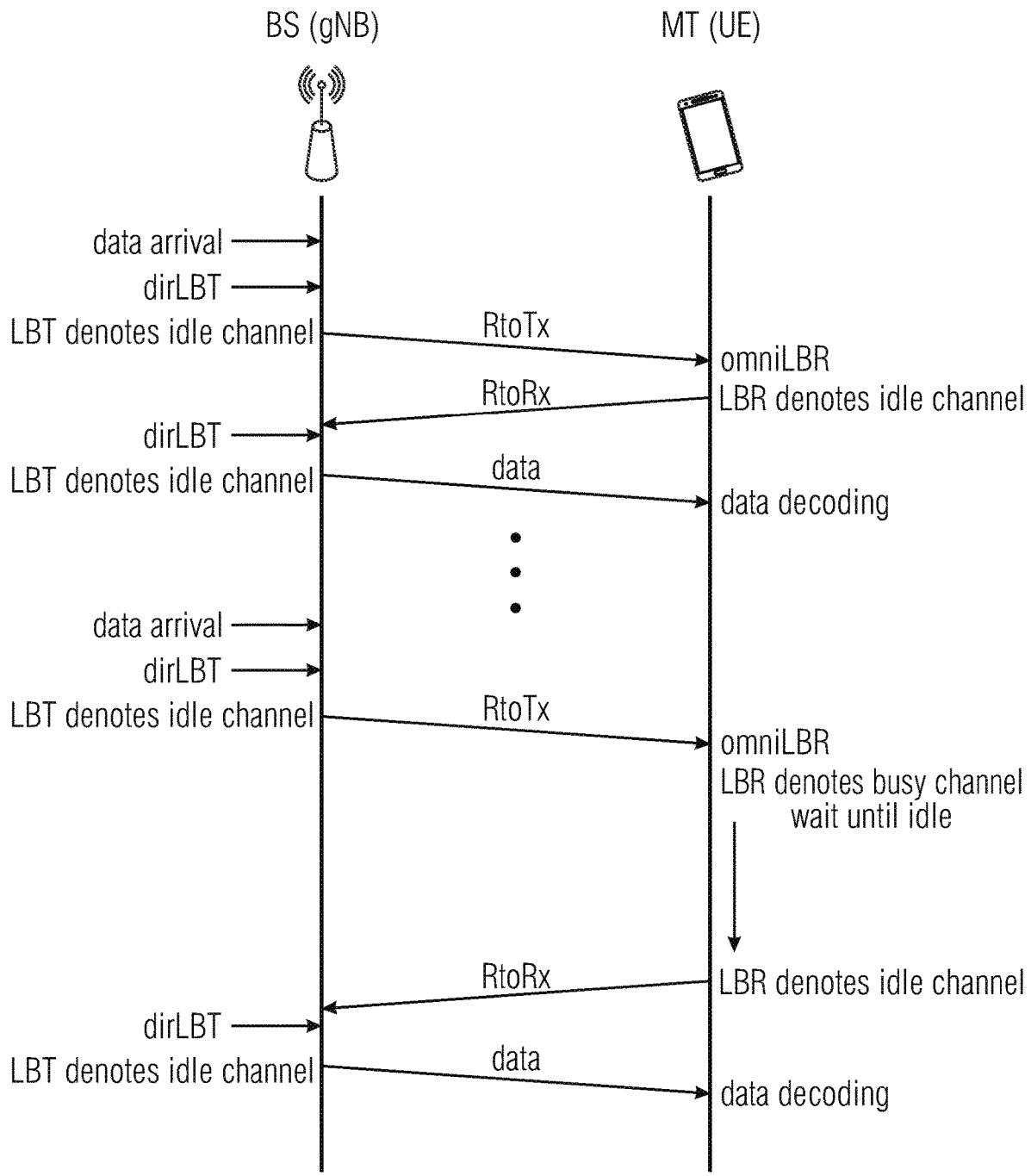
FIG. 7 illustrates LBR to complement LBT with the self-contained slot for DL-only.
Figure 8:
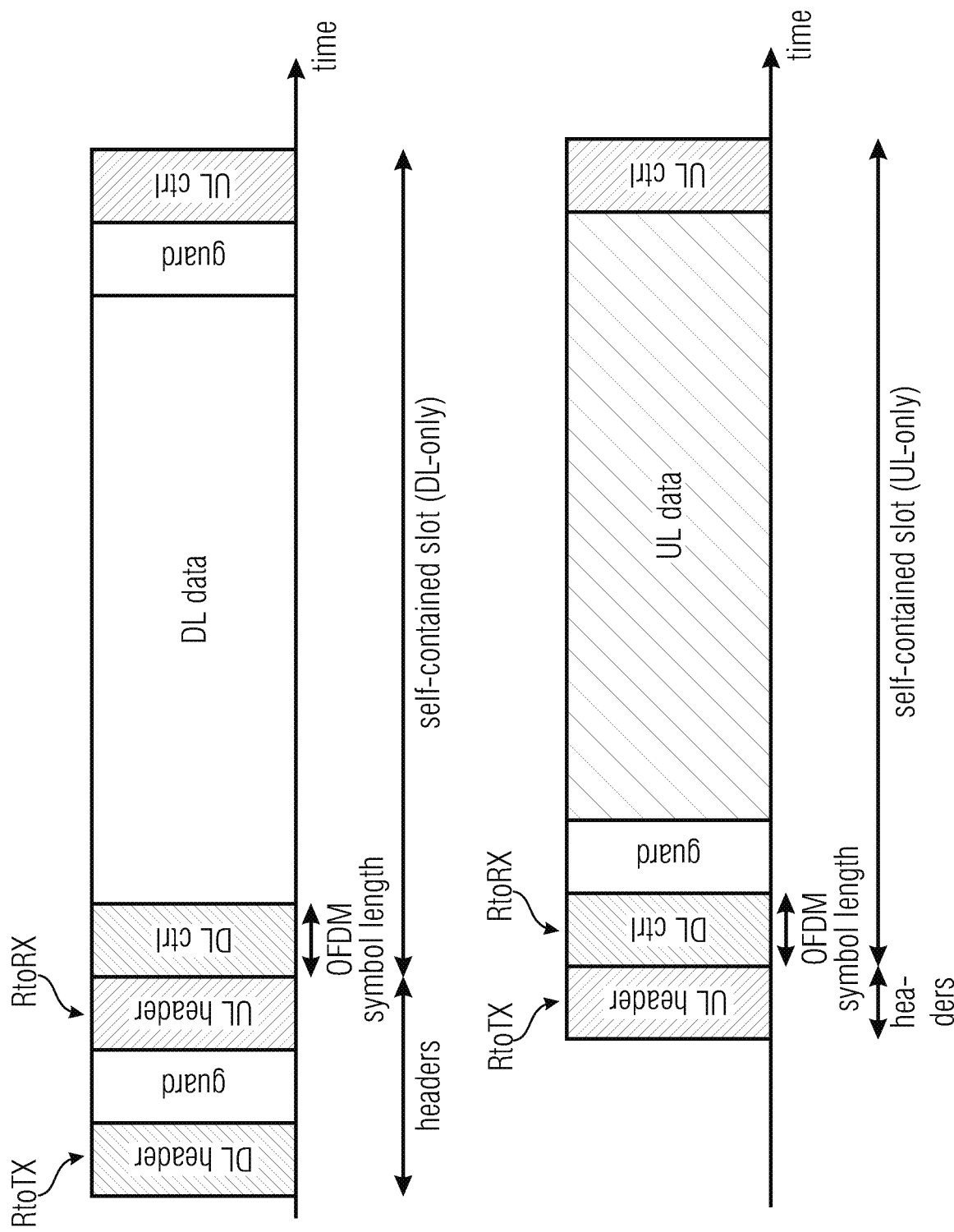
FIG. 8 illustrates LBR to complement LBT with the self-contained slot for UL-only.

According to this embodiment, contrary to the example in FIG. 7, it is not necessary for the first transceiver to receive a ready-to-transmit message from the second transceiver to start determining the information on the occupancy of the transmission channel. The first transceiver is, e.g., already aware that the second transceiver wants to transmit. For example, the first transceiver may, e.g., already just have received a data packet from the second transceiver and therefore may, e.g., assume that the second transceiver may intend to transmit another data packet. In another example, the BS or AP (access point), wherein the first or the second transceiver may be the BS or AP, already scheduled the data transmission in a DCI message in a PDCCH. Hence, if the first transceiver is the BS or AP, it is already aware of its own transmission, and if the second transceiver is the BS or AP, the first transceiver is aware of the transmission from the DCI message coming from the second transceiver, which schedules the data transmission. Thus, network traffic is reduced, as a ready-to-transmit message is not transmitted by the second transceiver. Moreover, the speed of data transmission is increased, as no time is lost by the first transmitter, which does not have to wait for the ready-to-transmit message from the second transceiver.

In an advantageous embodiment, the transceiver 300 of FIG. 2, e.g., a base station, may, e.g., be the first transceiver and one $302_1$ of the (one or more) other transceivers 302 of FIG. 2, e.g., a user device, may, e.g., be the second transceiver.

In other embodiments, one $302_1$ of the (one or more) other transceivers 302 of FIG. 2, e.g., a user device, may, e.g., be the first transceiver and the transceiver 300 of FIG. 2, e.g., a base station, may, e.g., be the second transceiver.

In further embodiments, one $302_1$ of the (one or more) other transceivers 302 of FIG. 2, e.g., a first user device, may, e.g., be the first transceiver and another one $302_n$ of the (one or more) other transceivers 302 of FIG. 2, e.g., a second user device, may, e.g., be the second transceiver.

In yet further embodiments, the first transceiver may, e.g., be a first base station, for example, a macro base station or a pico base station or a small-cell base station, or a relay base station; and the second transceiver may, e.g., be a second base station.

In an embodiment, the base station may not receive information on an occupancy of another transmission channel from the user device.

According to an embodiment of FIG. 2, a first transceiver for a wireless communication system according to another embodiment is provided. In that embodiment, the first transceiver is the base station 300.

The first transceiver determines information on an occupancy of a transmission channel.

Furthermore, the first transceiver transmits the information of the occupancy of the transmission channel to a second transceiver, wherein the second transceiver is a user device, e.g., the user device 302$_1$ of FIG. 2.

The base station does not receive information on an occupancy of another transmission channel from the user device.

According to this embodiment, the base station is the first transceiver that determines information on the occupancy of the transmission channel. The user device may intend to transmit the user data via the transmission channel. Thus, the embodiment relates to a situation where an uplink transmission of a data packet is intended. On the contrary, this embodiment does not relate to downlink data transmissions from the base station to the user device(s). This embodiment recognizes that it is particularly useful to employ the concepts of the invention on for uplink data transmissions. The base station can thus steer the plurality of user devices to defer their transmissions. Applying the concept also for downlink data packet transmissions would result in that that the base station would have to deal with a plurality of control messages from the user devices at the same time. To not apply the concept for data packet downlink transmissions, but only for data packet uplink transmissions may increase the efficiency of data transmissions in the wireless network.

According to an embodiment, the first transceiver (e.g., its transceiver unit 300$b$/302$b_1$) does not receive the user data via said transmission channel from the second transceiver (e.g., from its transceiver unit 302$b_1$/300$b$), if the first transceiver has determined that the transmission channel is occupied or disturbed, for example, wherein the first transceiver may consider the transmission channel disturbed, if, e.g., a power detection threshold is exceeded, e.g., by a Received Signal Strength Indicator, RSSI, or if a known sequence is detected. (For example, if the received power during a listening window is below a certain power threshold, or if, e.g. the correlation of the received signal with a known sequence to indicate the start of a transmission is below a certain threshold).

In an embodiment, the first transceiver may receive (e.g., at its transceiver unit 300$b$/302$b_1$) the user data via said transmission channel from the second transceiver (e.g., from its transceiver unit 302$b_1$/300$b$), if the first transceiver has indicated that the transmission channel is free (e.g., using its transceiver unit 300$b$/302$b_1$), and if the second transceiver has also determined that the transmission channel is free (such a determination may, e.g., be conducted by its signal processor 302$a_1$/300$a$), for example the second transceiver may consider the transmission channel free, if, e.g., the second transceiver conducts listen-before-talk and does not detect that another transmission is conducted via the transmission channel.

According to an embodiment, the first transceiver is a base station. The base station transmits a grant in a control region, e.g. PDCCH. The grant indicates the second transceiver where to perform its data transmission.

In another embodiment, first transceiver is a user device, the user device receives a scheduling assignment in a control region, e.g. PDCCH, wherein the scheduling assignment indicates the first transceiver where to receive its data transmission.

According to an embodiment, the first transceiver may transmit (e.g., using its transceiver unit 300$b$/302$b_1$) the information on the occupancy of the transmission channel within a control message via a control channel to the second transceiver.

In another embodiment, the control channel is located within the resources indicated for data transmission.

According to an embodiment, a location of the control channel within the resource indicated for data transmission is configured, e.g. by DCI or RRC signaling or SIB or MIB, or is preconfigured.

In an embodiment, the first transceiver may transmit (e.g., its transceiver unit 300$b$/302$b_1$) the control message via the control channel to the second transceiver (e.g., to its transceiver unit 302$b_1$/300$b$), wherein the control message indicates that the transmission channel is free, if the first transceiver has determined that the transmission channel is undisturbed and free.

In a further embodiment, the control channel may be part of the granted resource for PUSCH or the scheduled assignment for PDSCH and the PUSCH or PDSCH spans the remaining region of the resource.

According to an embodiment, the first transceiver does not transmit any message to the second transceiver via the control channel, if the first transceiver has determined that the transmission channel is disturbed or is not free.

In an embodiment, the control channel is an uplink clear-channel-assessment channel, UL-CCA-CH. Or, the control channel is a downlink clear-channel-assessment channel, DL-CCA-CH. Or, the control channel is a sidelink clear-channel-assessment channel, SL-CCA-CH.

According to an embodiment, the first transceiver is configured such that the first transceiver comprises information on at least one of a maximum time period needed to determine whether or not the transmission channel is undisturbed and free, for example, a time period needed for conducting listen-before-talk, a duration of the clear-channel-signal, a sequence to be used for a clear-channel-signal transmission, a user-device-specific sequence, for example, a base station provides an uplink grant to a plurality of user devices, and the user-device-specific sequence, for example, transmitted in the CCA-CH channel determines which user device is allowed to transmit, a bandwidth or frequency location of the clear-channel-signal transmission, a beam to use for the transmission of the UL-CCA-CH or the DL-CCA-CH or the SL-CCA-CH, a duration of a time gap between the control message transmitted via the UL-CCA-CH or the DL-CCA-CH or the SL-CCA-CH and a transmission of the user data in the transmission channel, for example, being a PUSCH or a PDSCH or a PSSCH, wherein this duration can also be zero, if the transmitter device is full-duplex capable for example, a time or frequency shift of when/where to perform the LBT, e.g. in case the transmitter knows about the current load on the radio channel; wherein, for example, said duration may be zero, if the second transceiver is full-duplex capable for example, a time or frequency shift of when/where to perform the LBT, e.g. in case the second transceiver knows about the current load on the radio channel.

In an embodiment, an uplink grant message may, e.g., specify the resource for transmission According to an embodiment, the existence of the UL-CCA-CH or of the DL-CCA-CH or of the SL-CCA-CH is indicated dynamically, e.g., by a base station, using an indicator in the downlink control information, DCI. And/or, the existence of the UL-CCA-CH or of the DL-CCA-CH or of the SL-CCA-CH is configured by Radio Resource Control signaling. And/or, the existence of the UL-CCA-CH or of the DL-CCA-CH or of the SL-CCA-CH is configured by the system information block, SIB, or the master information block, MIB. And/or, the existence of the UL-CCA-CH or of the DL-CCA-CH or of the SL-CCA-CH is preconfigured, e.g., for certain frequency bands.

In an embodiment, the first transceiver may select a beam out of two or more beams for the transmission of the user data as a proposed beam depending on a certain metric such as interference power, signal/beam received power, leakage power, SNR, SINR within each of the two or more beams for the transmission of the user data (such a selection may, e.g., be conducted by its signal processor $300a/302a_1$). The first transceiver may indicate the proposed beam to the second transceiver.

Leakage may, e.g., be defined as the interference measured by other devices caused by my own transmission. Leakage may, e.g., be measured by different transceivers in the network and by collecting such information in the interference control unit. The above concept may, e.g., be employed for FixedWirelessAccess where signal conditions behave static over time.

Choosing the best beam at the first transceiver, which shall receive the data packet from the first transceiver, is particularly useful, as it is helpful to determine on the receiver side of the packet, whether a reception of the packet is possible which the respective beam candidate. Thus, the concept allows to choose the beam with the best quality at the receiver side.

According to an embodiment, wherein the proposed beam is indicated within the control message.

In yet another embodiment, the proposed beam is indicated by using a certain UL-CCA-CH out of a plurality of UL-CCA-CHs, e.g. multiplexed in time, wherein each of the plurality of UL-CCA-CHs is associated to a different beam out of the two or more beams. Or, the proposed beam is indicated by using a certain DL-CCA-CH out of a plurality of DL-CCA-CHs, e.g. multiplexed in time, wherein each of the plurality of DL-CCA-CHs is associated to a different beam out of the two or more beams.

In an embodiment, the first transceiver may select the proposed beam out of the two or more beams by selecting a beam out of the two or more beams having a lowest interference among the two or more beams.

According to an embodiment, the first transceiver my choose one DL-CCA-CH or UL-CCA-CH out of a set of multiple DL-CCA-CHs or multiple UL-CCA-CHs each being associated with a beam to indicate the best beam.

According to an embodiment, the first transceiver may select the proposed beam out of the two or more beams by selecting a beam out of the two or more beams having a highest signal to interference plus noise ratio, SINR, among the two or more beams.

In an embodiment, the control message may, e.g., be valid for a number of data transmissions within a configured or preconfigured time window or a configured or preconfigured number of consecutive data transmissions of the second transceiver.

Furthermore, according to an embodiment, an apparatus for interference control for a wireless communication system is provided. The apparatus for interference control may, e.g., be the transceiver 300 of FIG. 2, e.g., a base station.

The apparatus for interference control receives information on a plurality of transmissions of a plurality of transceivers in the wireless communication system. The plurality of transceivers may, e.g., be the other transceivers $302_1$, $302_n$ of FIG. 2, e.g., the plurality of user devices.

Moreover, the apparatus for interference control schedules the plurality of transmissions of the plurality of transceivers in the wireless communication system to avoid an interference of a first one of the plurality of transmissions with a second one of the plurality of transmissions.

According to this embodiment, the above concepts are not (only) employed for informing the transceiver, e.g., a user device, that a data packet transmission shall be deferred. Instead, the concepts can be employed to schedule of the different data packet transmissions from the plurality of transceivers (the plurality of user devices), which helps to avoid data packet collisions.

In an embodiment, the apparatus for interference control is a base station and/or communicates with one or more base stations.

According to an embodiment, the apparatus for interference control is to receive information on planned transmissions from a plurality of transceivers, for example, from base stations, UEs, access points, STAs, wherein the information on the planned transmissions comprises at least one of the following:

Time and frequency resource,
Beam direction,
Antenna array orientation,
Transceiver position coordinates,
Transmit power,
Transmit power including beamforming gains.

The BS and the Access point (AP) may, e.g., report for the connected UEs/STAs.

In an embodiment, the apparatus for interference control is for scheduling the plurality of transmissions of the plurality of transceivers in the wireless communication system
  by detecting whether or not the first one of the plurality of transmissions interferes with the second one of the plurality of transmissions, and
  by transmitting a first command to a first one of the plurality of transceivers which conducts the first one of the plurality of transmissions, wherein the first command instructs the first one of the plurality of transceivers to defer the first one of the plurality of transmissions by a first time period, and/or
  by transmitting a second command to a second one of the plurality of transceivers which conducts the second one of the plurality of transmissions, wherein the second command instructs the second one of the plurality of transceivers to defer the second one of the plurality of transmissions by a second time period.

The first command may, e.g. also be send to the BS/AP which is responsible for that transceiver According to an embodiment, the apparatus for interference control may transmit a third command to the plurality of transceivers instructing the plurality of transceivers to deactivate a random back-off procedure; or wherein the deactivation of the random back-off procedure is preconfigured, e.g. for certain unlicensed bands.

As the above concepts realize a scheduling of the different data transmissions from the different transceivers (e.g., user devices), the random back-off procedure is no longer necessary. More than that, it is useful to deactivate the random back-off procedure in case of scheduling, as the random back-off procedures at the plurality of transceivers is problematic for the above scheduling approach because of the random or the pseudo-random character of the random back-off procedures.

In an embodiment, e.g., if the transmission channel is occupied or disturbed, the apparatus for interference control may transmit the third command to the plurality of transceivers further instructing the plurality of transceivers to store a packet into a memory.

According to an embodiment, the apparatus for interference control is for scheduling the plurality of transmissions of the plurality of transceivers in the wireless communication system based on the information that for the plurality of transceivers a random back-off procedure is deactivated for one or more predefined frequency bands Moreover, in a further embodiment of FIG. 2, a second transceiver for a wireless communication system is provided.

The second transceiver does not transmit a ready-to-transmit message from the second transceiver with which the second transceiver would inform the first transceiver that the second transceiver intends to transmit user data to the first transceiver.

Furthermore, the second transceiver receives information on an occupancy of a transmission channel from the first transceiver.

In an advantageous embodiment, the transceiver 300 of FIG. 2, e.g., a base station, may, e.g., be the first transceiver and one 302₁ of the (one or more) other transceivers 302 of FIG. 2, e.g., a user device, may, e.g., be the second transceiver.

In other embodiments, one 302₁ of the (one or more) other transceivers 302 of FIG. 2, e.g., a user device, may, e.g., be the first transceiver and the transceiver 300 of FIG. 2, e.g., a base station, may, e.g., be the second transceiver.

In further embodiments, one 302₁ of the (one or more) other transceivers 302 of FIG. 2, e.g., a first user device, may, e.g., be the first transceiver and another one 302ₙ of the (one or more) other transceivers 302 of FIG. 2, e.g., a second user device, may, e.g., be the second transceiver.

In yet another embodiment, the first transceiver may, e.g., be a first base station, for example, a macro base station or a pico base station or a small-cell base station, or a relay base station; and the second transceiver may, e.g., be a second base station.

According to an embodiment, the second transceiver is a user device, wherein the first transceiver is a base station.

In an embodiment, the user device does not send information on an occupancy of another transmission channel to the base station.

Moreover, according to a yet further embodiment of FIG. 2, a second transceiver for a wireless communication system is provided. The second transceiver is a user device, e.g., the user device 302₁.

The second transceiver receives information on an occupancy of a transmission channel from a first transceiver, the first transceiver being a base station, e.g., the base station 300.

The user device does not send information on an occupancy of another transmission channel to the base station.

According to an embodiment, the second transceiver does not send the user data via said transmission channel to the first transceiver, if the second transceiver has received the information from the first transceiver that the transmission channel is occupied or disturbed, for example, wherein the first transceiver may consider the transmission channel disturbed, if, e.g., a power detection threshold is exceeded, e.g., by a Received Signal Strength Indicator (RSSI), or if a known sequence is detected.

In an embodiment, the second transceiver may transmit the user data via said transmission channel to the first transceiver, if the first transceiver has indicated to the second transceiver that the transmission channel is free, and if the second transceiver has also determined that the transmission channel is free, for example the second transceiver may consider the transmission channel free, if, e.g., the second transceiver conducts listen-before-talk and does not detect that another transmission is conducted via the transmission channel.

According to an embodiment, the second transceiver is a user device. The user device receives a grant in a control region, e.g. PDCCH. The grant indicates the second transceiver where to perform its data transmission.

In another embodiment, second transceiver is a base station. The base station transmits a scheduling assignment in a control region, e.g. PDCCH, wherein the scheduling assignment indicates the first transceiver where to receive its data transmission.

According to an embodiment, the second transceiver may receive the information on the occupancy of the transmission channel within a control message via the control channel from the first transceiver.

In yet another embodiment, the control channel is located within the resources indicated for data transmission.

According to an embodiment, a location of the control channel within the resource indicated for data transmission is configured, e.g. by DCI or RRC signaling or SIB or MIB, or is preconfigured.

In an embodiment, the second transceiver may receive the control message via the control channel from the first transceiver, wherein the control message indicates that the transmission channel is free, if the first transceiver has determined that the transmission channel is undisturbed and free.

According to an embodiment, the second transceiver does not receive any message from the first transceiver via the control channel, if the first transceiver has determined that the transmission channel is disturbed or is not free.

In an embodiment, the control channel may, e.g., be an uplink clear-channel-assessment channel, UL-CCA-CH. Or, the control channel may, e.g., be a downlink clear-channel-assessment channel, DL-CCA-CH. Or, the control channel may, e.g., be a sidelink clear-channel-assessment channel, SL-CCA-CH.

According to an embodiment, the second transceiver is configured such that the second transceiver comprises information on at least one of a maximum time period needed to determine whether or not the transmission channel is undisturbed and free, for example, a time period needed for conducting listen-before-talk, a duration of the clear-channel-signal, a sequence to be used for a clear-channel-signal transmission, a user-device-specific sequence, for example, a base station provides an uplink grant to a plurality of user devices, and the user-device-specific sequence, for example, transmitted in the CCA-CH channel determines which user device is allowed to transmit, a bandwidth or frequency location of the clear-channel-signal transmission, a beam to use for the transmission of the UL-CCA-CH or the DL-CCA-CH or the SL-CCA-CH, a duration of a time gap between the control message transmitted via the UL-CCA-CH or the DL-CCA-CH or the SL-CCA-CH and a transmission of the user data in the transmission channel, for example, being a PUSCH or a PDSCH or a PSSCH, wherein this duration can also be zero, if the transmitter device is full-duplex capable for example, a time or frequency shift of when/where to perform the LBT, e.g. in case the transmitter knows about the current load on the radio channel; wherein, for example, said duration may be zero, if the second transceiver is full-duplex capable for example, a time or frequency shift of when/where to perform the LBT, e.g. in case the second transceiver knows about the current load on the radio channel.

According to an embodiment, the first transceiver is a base station and the second transceiver is a user device; or the first transceiver is the user device and the second transceiver is the base station.

According to an embodiment, the existence of the UL-CCA-CH or of the DL-CCA-CH or of the SL-CCA-CH is indicated dynamically, e.g., by a base station, using an indicator in the downlink control information, DCI. And/or, the existence of the UL-CCA-CH or of the DL-CCA-CH or of the SL-CCA-CH is configured by Radio Resource Control signaling. And/or, the existence of the UL-CCA-CH or of the DL-CCA-CH or of the SL-CCA-CH is configured by the system information block, SIB, or the master information block, MIB. And/or, the existence of the UL-CCA-CH or of the DL-CCA-CH or of the SL-CCA-CH is preconfigured, e.g., for certain frequency bands.

In an embodiment, the second transceiver is to receive from the first transceiver an indication on a proposed beam out of two or more beams for the transmission of the user data, wherein a selection of the proposed beam depends on a certain metric such as interference power, signal/beam received power, leakage power, SNR, SINR within each of the two or more beams for the transmission of the user data, According to an embodiment, the proposed beam is indicated within the control message.

In yet another embodiment, the proposed beam is indicated by using a certain UL-CCA-CH out of a plurality of UL-CCA-CHs, e.g. multiplexed in time, wherein each of the plurality of UL-CCA-CHs is associated to a different beam out of the two or more beams. Or, the proposed beam is indicated by using a certain DL-CCA-CH out of a plurality of DL-CCA-CHs, e.g. multiplexed in time, wherein each of the plurality of DL-CCA-CHs is associated to a different beam out of the two or more beams.

In an embodiment, the proposed beam is a beam out of the two or more beams having a lowest interference among the two or more beams.

According to an embodiment, the proposed beam is a beam out of the two or more beams having a highest signal to interference plus noise ratio, SINR, among the two or more beams.

In an embodiment, the control message may, e.g., be valid for a number of data transmissions within a configured or preconfigured time window or a configured or preconfigured number of consecutive data transmissions of the second transceiver.

Moreover, a transceiver for a wireless communication system according to another embodiment is provided. The transceiver is one of a plurality of transceivers. The transceiver may, for example, be transceiver $302_1$ of the other transceivers $302_1, \ldots, 302_n$ of FIG. 2.

The transceiver transmits information on a transmission of the transceiver within the wireless network to an apparatus for interference control, the transmission of the transceiver being one of a plurality of transmissions of a plurality of transceivers in the wireless communication system. The apparatus for interference control may, e.g., be transceiver 300 of FIG. 2, e.g., a base station.

Moreover, the transceiver receives instructions from the apparatus for interference control on a scheduling of the transmission of transceiver within the wireless network.

Furthermore, the transceiver adapts the transmission within the wireless network in response to receiving the instructions from the apparatus for interference control on the scheduling of the transmission of transceiver within the wireless network.

In an embodiment, the apparatus for interference control is a base station and/or communicates with one or more base stations.

According to an embodiment, the transceiver transmits information on a planned transmission, for example, wherein the transceiver is a base station or a UE, or an access point, or a STA (station, user device in IEEE 802.11), wherein the information on the planned transmissions comprises at least one of the following:

Time and frequency resource,

Beam direction,

Antenna array orientation,

Transceiver position coordinates,

Transmit power,

Transmit power including beamforming gains.

In an embodiment, the transceiver may receive a command from the apparatus for interference control, wherein the command instructs the transceiver to defer the transmission by a time period, and wherein the transceiver may defer the transmission by the time period in response to receiving the command from the apparatus for interference control.

According to an embodiment, the transceiver may receive another command from the apparatus for interference control instructing the transceiver to deactivate a random back-off procedure; and the transceiver may deactivate the random back-off procedure in response to receiving the other command from the apparatus for interference control. Or, the deactivation of the random back-off procedure is preconfigured, e.g. for certain unlicensed bands.

In an embodiment, the transceiver comprises a memory. The transceiver may store a packet into the memory.

According to an embodiment, the transceiver may deactivate a random back-off procedure for one or more predefined frequency bands. The transceiver does not deactivate the random back-off procedure for one or more other frequency bands.

Moreover, a wireless communication system according to an embodiment is provided. The wireless communication system comprises the first transceiver as described above and the second transceiver as described above.

Furthermore, a wireless communication system according to another embodiment is provided. The wireless communication system comprises the apparatus for interference control as described above and two or more transceivers, wherein each of the two or more transceivers is a transceiver as described above.

In the following, embodiments of the present invention are described in more detail.

Embodiments of the present invention provide a receiver-assisted LBT using only Clear Channel Signaling.

The LBT procedure as used in NR-U currently is not working properly in case beam-based transmissions are used extensively. The major issue comes from the fact that the receiver is in the best position to evaluate the status of the channel. However, the LBT is performed at the transmitter and fails to detect the perceived channel at the receiver side. To overcome this issue LBR-based protocols have been proposed (see SOTA section). However, we put this approach even further and propose a receiver-activated LBT protocol, as depicted in FIG. 9.

Figure 9:
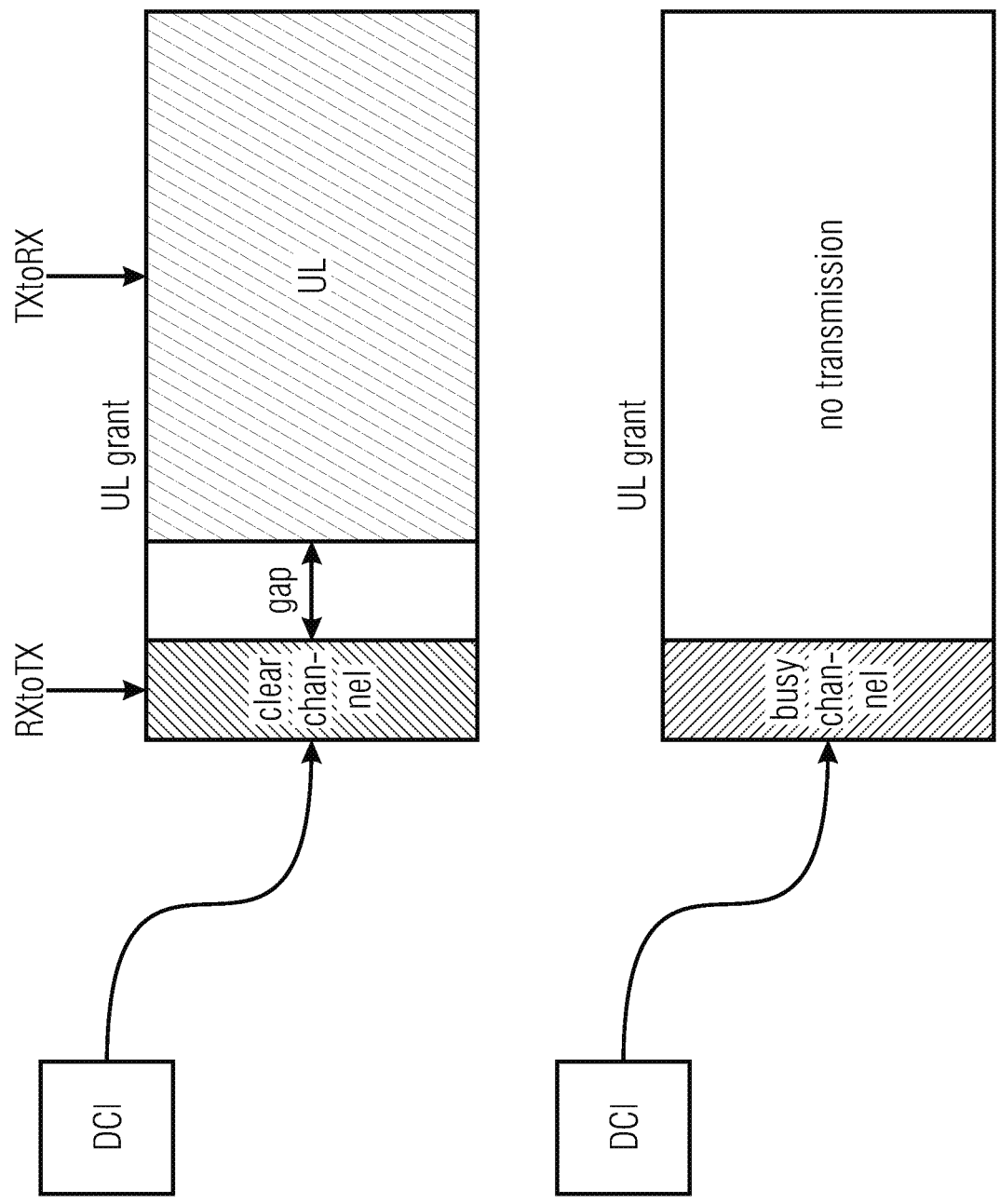
FIG. 9 illustrates a receiver-activated LBT for NR-U according to an embodiment.

FIG. 9 illustrates a receiver-activated LBT for NR-U according to an embodiment.

Figure 10:
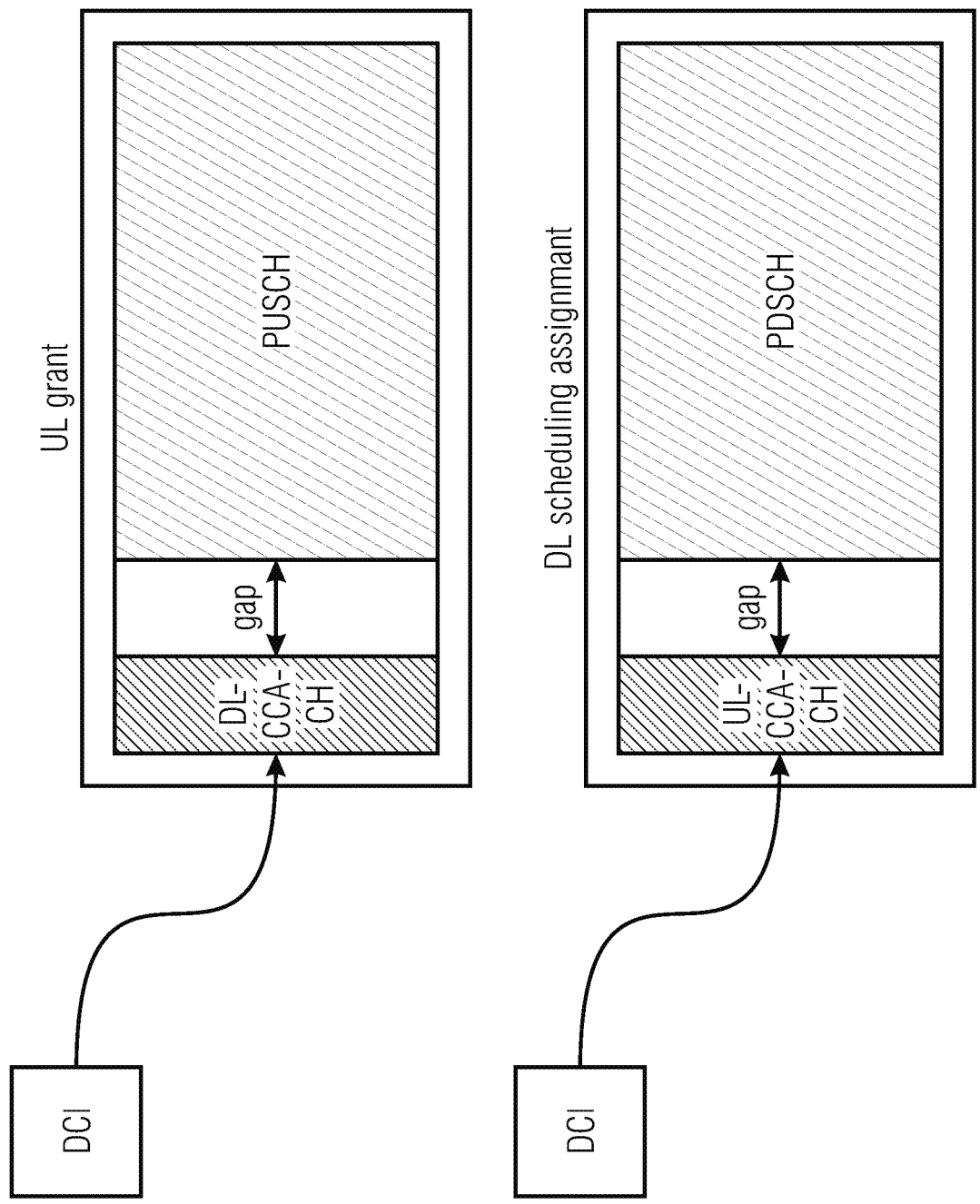
FIG. 10 illustrates receiver-assisted LBT within grant/scheduling assignment according to an embodiment.

Particular embodiments relate to a dedicated region within grant/scheduling assignment for transmitting clear-channel-signal FIG. 10 illustrates receiver-assisted LBT within grant/scheduling assignment according to an embodiment.

As shown in FIG. 10, the gNB provides the UE with an UL grant. (DL scheduling assignment works analogously.) The grant/scheduling assignment provides the resource for data transmission, e.g. PUSCH or PDSCH, where in the beginning of the provided resource a part is reserved for transmitting the Clear-Channel-Signal (CCS) by the receiver device, e.g. Downlink Clear-Channel-Assessment Channel (DL-CCA-CH) or Uplink Clear-Channel-Assessment Channel (UL-CCA-CH).

The receiver device, e.g. UE or gNB, performs an LBT within that region in the grant/scheduling assignment and transmits a clear-channel-signal, e.g. DMRS-based sequence, in the UL-CCA-CH or DL-CCA-CH, if the LBT succeeds. Otherwise, no signal is transmitted. The transmitter device awaiting the sequence, performs its LBT within the gap provided only if the signal in the UL/DL-CCACH is detected. In case the receiver device's LBT also succeeds, the PDSCH or PUSCH is transmitted.

In the following, further aspects are presented.

The existence of UL/DL-CCA-CH is indicated to the UE by the network, e.g. using RRC signaling, or pre-configured for a certain band, e.g. 60 GHz The configuration/pre-configuration may, e.g., include information regarding
  the duration of the receiver LBT to be performed, and/or
  the duration of the clear-channel-signal, and/or
  the sequence to be used for clear-channel-signal transmission, and/or
  the bandwidth/frequency location of the clear-channel-signal transmission, and/or
  the duration of the gap between DL/UL-CCA-CH and PUSCH/PDSCH, where this duration can also be zero, if the transmitter device is full-duplex capable for example, a time or frequency shift of when/where to perform the LBT, e.g. in case the transmitter knows about the current load on the radio channel.

The existence of UL/DL-CCA-CH may, e.g., also be indicated dynamically using an indicator in the DCI including the grant or scheduling assignment.

Some embodiments provide a receiver-assisted LBT only for Uplink (UL).

In a further embodiment, we propose to use the receiver-assisted LBT procedure only for UL data transmissions, i.e. PUSCH. For DL transmissions, i.e. PDSCH, awaiting a feedback from the UE might limit the scheduling flexibility of the gNB and put an additional burden on the UE. Hence, the overall system performance can be improved by applying the proposed procedure only for UL despite the increased interference created by gNB transmissions, such as PDSCH.

Some embodiments provide a Clear-Channel-Signal indicating the beam to use.

The transmitter device indicates or is configured with a set of potential beams to use for the transmission. The receiver device chooses based on its LBT the most appropriate beam, e.g. with the lowest interference or highest SINR, and indicates in the clear-channel-signal which beam to use. The transmitter in response performs its LBT for the proposed beam, and transmits using this beam in case the LBT was successful.

Figure 11:
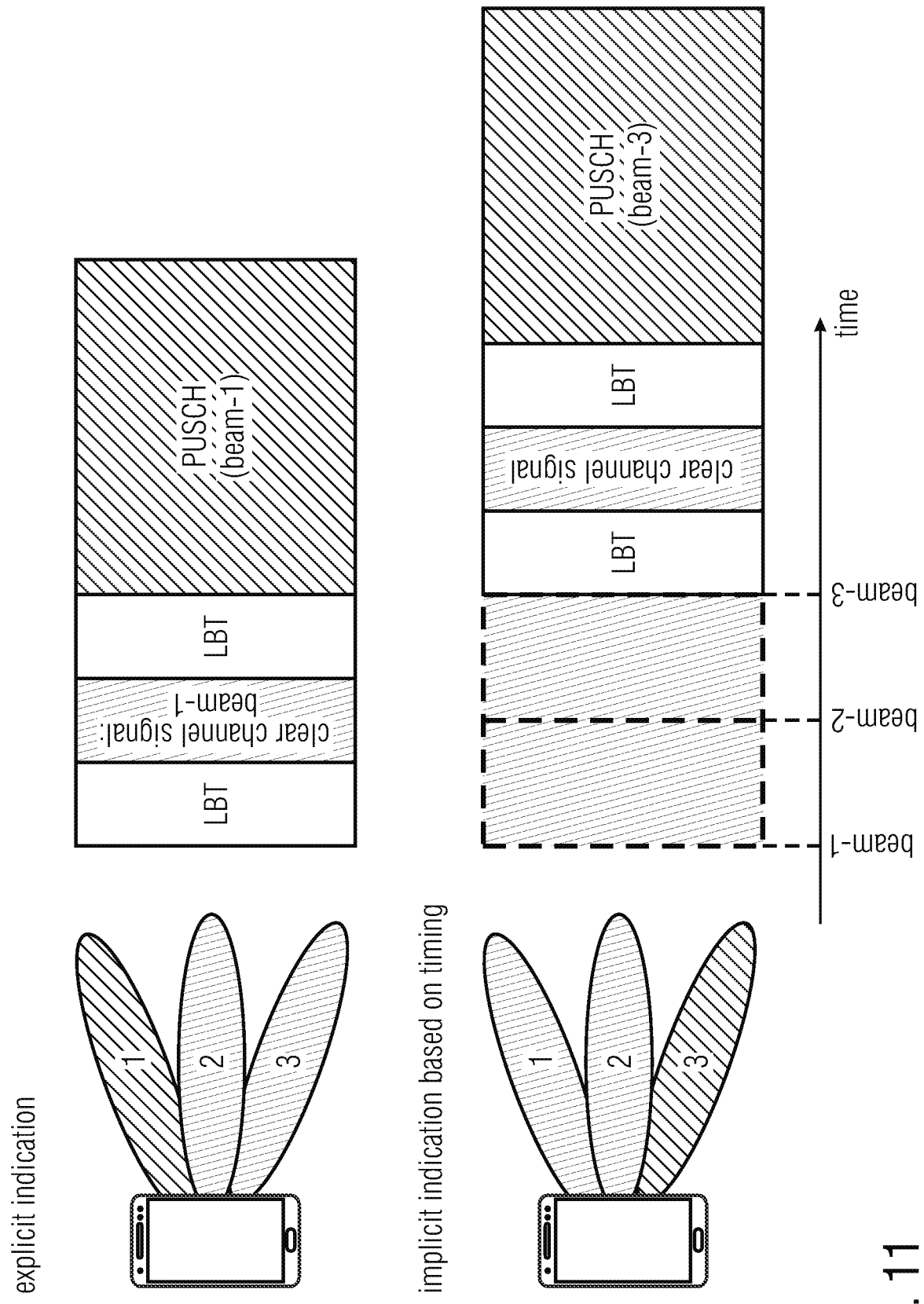
FIG. 11 illustrates examples for employing a Clear-Channel-Signal for indicating the beam to use using explicit signaling (top of FIG. 11) and using implicit indication based on timing (bottom of FIG. 11).

FIG. 11 illustrates examples for employing a Clear-Channel-Signal for indicating the beam to use using explicit signaling (top of FIG. 11) and using implicit indication based on timing (bottom of FIG. 11).

In some embodiments, an interference control unit for unlicensed bands in high frequencies is provided.

The LBT procedure becomes ineffective if massive use of beamforming is made. However, interference has to be controlled and minimized as much as possible. Hence, we propose an interference control unit for NR-U systems working in bands with massive usage of beamforming, such as high frequency bands in FR2, e.g. 60 GHz. The interference control unit may be in a gNB, in a UE or in higher layers of the network. Depending on the scenario, it might work autonomously (within the PLMN or within a cell) or it might communicate with other interference control units of the same or a different PLMN. Furthermore, it may also communicate with Access Points (APs) of other Radio Access Technologies (RAT), such as Wifi 802.11, LTE LAA or other, in order to coordinate or to adapt its own interference control mechanisms. Since the interference control unit is aware of (almost) all transmissions in the surrounding, the transmit direction and the position of the UEs, it can schedule the UEs in a way to minimize their impact on each other.

Figure 12:
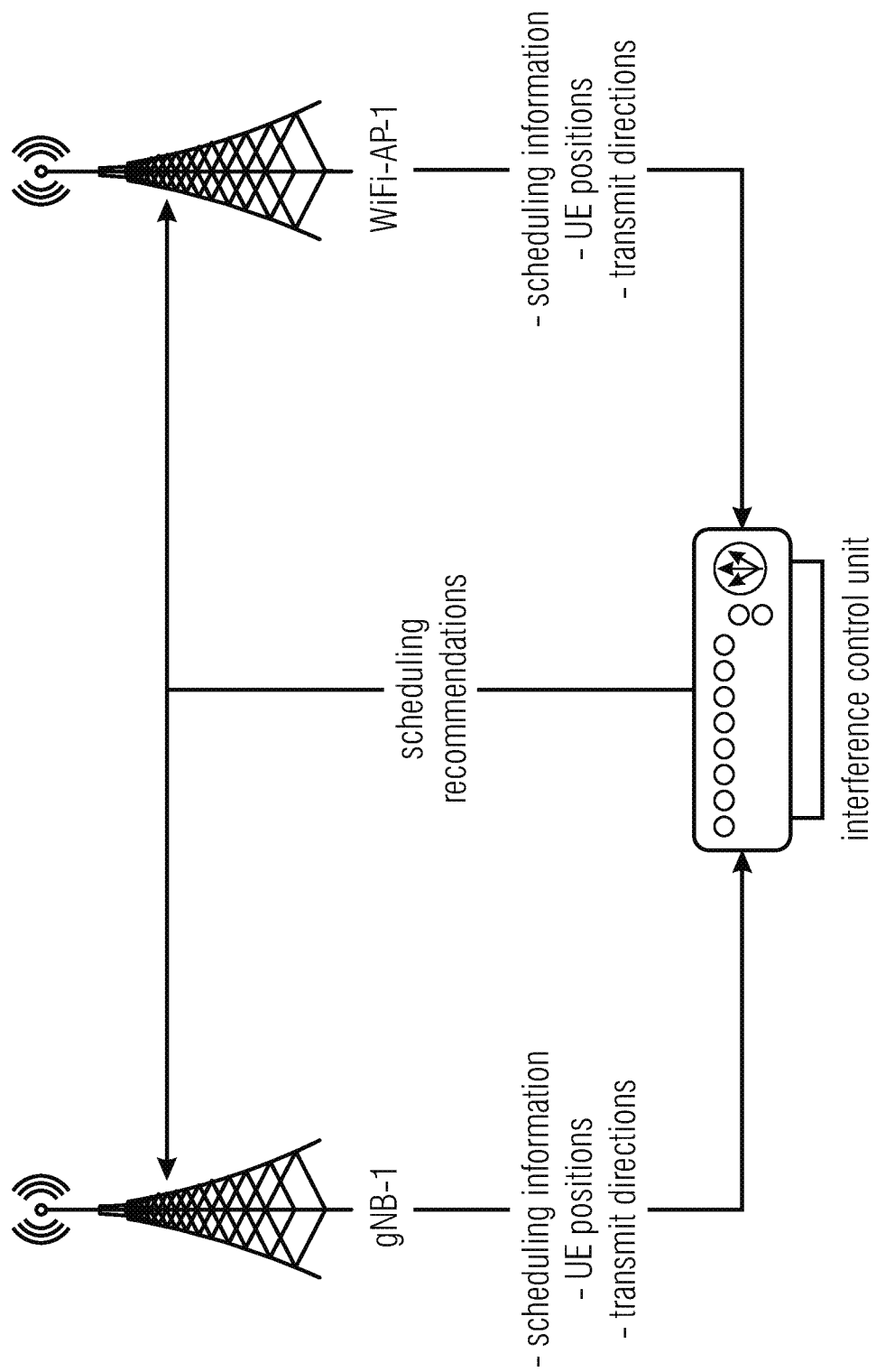
FIG. 12 illustrates an Interference Control Unit giving scheduling recommendations according to an embodiment.

FIG. 12 illustrates an Interference Control Unit giving scheduling recommendations according to an embodiment.

According to some embodiments, random-backoff for 60 GHz for interference control may, e.g., be deactivated.

However, one of the major problems to deal with, is the random back-off. Since the random back-off cannot be controlled or predicted, the interference coordination will suffer under this mechanism.

Hence, we propose that the network configures the UEs to deactivate the random back-off procedure, such that the UEs only do the LBT for the contention window size (CWS) or a normal CAT-2 LBT, transmit if the channel was found to be free, and drop the grant, if the channel was found to be busy. This would lead to the UE PHY reporting to the UE MAC that the packet could not be transmitted, such that the UE MAC adds this packet again into the buffer.

In another embodiment, the random back-off deactivation is pre-defined for certain bands, such as high frequency bands, e.g. the 60 GHz band.

Embodiments of the present invention may, e.g., be employed for NR_U and for NR.

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a UE may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator, or a Wifi non-AP STA (AP=Access Point, STA=Station), e.g. 802.11ax or 802.11be. In accordance with embodiments, a base station may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system, or a Wifi AP STA, e.g. 802.11ax or 802.11be.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system.

FIG. 13 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS eNB Evolved Node B (3G base station)
LTE Long-Term Evolution
NR-U New Radio in unlicensed spectrum
UE User Equipment (User Terminal)
BS Base Station
eNB Evolved Node B (base station)
gNB Generation Node B (base station)
RAN Radio Access Network
Uu eNB-UE link
D2D Device-to-device
PC5 UE-UE link/Interface using Sidelink Channel for D2D communication
IE Information Element
V2V Vehicular-to-vehicular communications
V2X Vehicular-to-everything communications
D2D Device-to-Device
FDM Frequency Division Multiplexing
RA Resource Allocation
SCI Sidelink Control Information
SL Sidelink
sTTI Short(end) Transmission Time Interval
PUCCH Physical Uplink Control Channel
PDCCH Physical Downlink Control Channel
DMRS Demodulation Reference Signal
CBR Channel Busy Ratio
COT Channel occupancy time
CWS Contention Window Size
RtoTx Ready to Transmit
RtoRx Ready to Receive
LBT Listen-before-Talk
LBR Listen-before-Receive
RSU Road Side Unit
HARQ Hybrid Automatic Repeat Request

REFERENCES

[1] Sandra Lagen and Lorenza Giupponi: Listen Before Receive for Coexistence in Unlicensed mmWave Bands.

The invention claimed is:

1. An apparatus for interference control for a wireless communication system, the apparatus comprising:
a transceiver circuit; and
a processor circuit,
wherein the processor circuit is arranged to receive information on a plurality of transmissions of a plurality of transceivers in the wireless communication system,
wherein the processor circuit is arranged to schedule the plurality of transmissions of the plurality of transceivers in the wireless communication system to avoid an interference of a first transmission of the plurality of transmissions with a second transmission of the plurality of transmissions,
wherein the processor circuit is arranged to schedule the plurality of transmissions of the plurality of transceivers in the wireless communication system by:
detecting whether or not the first transmission of the plurality of transmissions interferes with the second transmission of the plurality of transmissions, and
in response to detecting that the first transmission interferes with the second transmission, controlling the apparatus to cause the transceiver circuit to transmit:
a first command to a first transceiver of the plurality of transceivers, wherein the first transceiver conducts the first transmission of the plurality of transmissions, wherein the first command instructs the first transceiver of the plurality of transceivers to defer the first transmission of the plurality of transmissions by a first time period, and/or
a second command to a second transceiver of the plurality of transceivers, wherein the second transceiver conducts the second transmission of the plurality of transmissions, wherein the second command instructs the second transceiver of the plurality of transceivers to defer the second transmission of the plurality of transmissions by a second time period.

2. The apparatus of claim 1, wherein the apparatus comprises a base station and/or communicates with one or more base stations.

3. The apparatus of claim 1,
wherein the processor circuit is arranged to receive information on planned transmissions from at least some of the plurality of transceivers, wherein the information on the planned transmissions comprises at least one of the following:
a time and frequency resource, a beam direction, an antenna array orientation, transceiver position coordinates, transmit power, and beamforming gains.

4. The apparatus of claim 1,
wherein the processor circuit is arranged to control the apparatus to cause the transceiver circuit to transmit a third command to the plurality of transceivers instructing the plurality of transceivers to deactivate a random back-off procedure, or wherein the deactivation of the random back-off procedure is preconfigured for at least one unlicensed band bands.

5. The apparatus of claim 1,
wherein the processor circuit is arranged to schedule the plurality of transmissions of the plurality of transceivers in the wireless communication system based on information that for the plurality of transceivers a random back-off procedure is deactivated for one or more predefined frequency bands.

6. A wireless communication system, comprising:
the apparatus of claim 1, and
the first transceiver and the second transceiver of claim 1.

7. A first transceiver for a wireless communication system, wherein the wireless communication system comprises a plurality of transceivers, the first transceiver comprising:

a processor circuit; and at least one antenna, wherein the processor circuit is configured to control the first transceiver to transmit information via the antenna in a first transmission of the first transceiver within the wireless communication system to an apparatus, wherein the apparatus is arranged for interference control, wherein the first transmission of the first transceiver is one of a plurality of transmissions of the plurality of transceivers in the wireless communication system, wherein the first transceiver is arranged to receive instructions from the apparatus for interference control on a scheduling of the first transmission of the first transceiver within the wireless network, wherein the transceiver is arranged to adapt the first transmission within the wireless communication system in response to receiving the instructions from the apparatus for interference control on the scheduling of the first transmission of the first transceiver within the wireless communication system, wherein the apparatus is arranged to schedule the plurality of transmissions of the plurality of transceivers in the wireless communication system to avoid an interference of the first transmission with a second transmission of a second transceiver of the plurality of transceivers, wherein the apparatus is arranged to schedule the plurality of transmissions of the plurality of transceivers in the wireless communication system by:

detecting whether or not the first transmission interferes with the second transmission, and in response to detecting that the first transmission interferes with the second transmission, transmitting:

a first command to the first transceiver, wherein the first command instructs the first transceiver to defer the first transmission by a first time period, and/or a second command to the second transceiver of the plurality of transceivers, wherein the second command instructs the second transceiver to defer the second transmission by a second time period.

8. The first transceiver of according to claim 7, wherein the apparatus for interference control comprises a base station and/or communicates with one or more base stations.

9. The first transceiver of according to claim 7, wherein the first transceiver is arranged to transmit information on a planned transmission, wherein the information on the planned transmission comprises at least one of the following:

a time and frequency resource, a beam direction, an antenna array orientation, transceiver position coordinates, transmit power, and beamforming gains.

10. The first transceiver of claim 7, wherein the first transceiver is arranged to defer the first transmission by the first time period in response to receiving the first command from the apparatus for interference control.

11. The first transceiver according to claim 7, wherein the first transceiver is arranged to receive a third command from the apparatus for interference control, wherein the third command instructs the first transceiver to deactivate a random back-off procedure, and wherein the first transceiver is arranged to deactivate the random back-off procedure in response to receiving the third command from the apparatus for interference control, or wherein the deactivation of the random back-off procedure is preconfigured, e.g. for at least one band.

12. The first transceiver of according to claim 7, wherein the first transceiver is arranged to deactivate a random back-off procedure for at least a first predefined frequency band, wherein the first transceiver is arranged to not deactivate the random back-off procedure for at least a second frequency band.

13. A method for operating a wireless communication system, the method comprising:

an apparatus for interference control receiving information on a plurality of transmissions of a plurality of transceivers in the wireless communication system, the apparatus scheduling the plurality of transmissions of the plurality of transceivers in the wireless communication system to avoid an interference of a first transmission of the plurality of transmissions with a second transmission of the plurality of transmissions, wherein the first transmission is conducted by a first transmitter among the plurality of transceivers, wherein the second transmission is conducted by a second transmitter among the plurality of transceivers, wherein the apparatus is arranged to schedule the plurality of transmissions of the plurality of transceivers in the wireless communication system by:

detecting whether or not the first transmission interferes with the second transmission, and in response to detecting that the first transmission interferes with the second transmission, transmitting:

a first command to the first transceiver, wherein the first command instructs the first transceiver to defer the first transmission by a first time period, and/or a second command to the second transceiver of the plurality of transceivers, wherein the second command instructs the second transceiver to defer the second transmission by a second time period.

14. A method for operating a wireless communication system, the method comprising:

transmitting, from a first transceiver to an apparatus for interference control, information on a first transmission of the transceiver within the wireless communication system, wherein the first transmission of the first transceiver is one of a plurality of transmissions of a plurality of transceivers in the wireless communication system, receiving instructions from the apparatus for interference control at the first transceiver on a scheduling of the first transmission of the first transceiver within the wireless communication system, adapting the first transmission within the wireless communication system by the first transceiver in response to receiving the instructions from the apparatus for interference control on the scheduling of the transmission of transceiver within the wireless communication system, wherein the apparatus is arranged to schedule the plurality of transmissions of the plurality of transceivers in the wireless communication system to avoid an interference of the first transmission with a second transmission of a second transceiver of the plurality of transceivers, wherein the apparatus is arranged to schedule the plurality of transmissions of the plurality of transceivers in the wireless communication system by:

detecting whether or not the first transmission interferes with the second transmission, and in response to detecting that the first transmission interferes with the second transmission, transmitting:

a first command to the first transceiver, wherein the first command instructs the first transceiver to defer the first transmission by a first time period, and/or a second command to the second transceiver of the plurality of transceivers, wherein the second command instructs the second transceiver to defer the second transmission by a second time period.

15. A non-transitory digital storage medium having stored thereon processor-executable instructions to perform the method of claim 13
when the processor-executable instructions are executed by a processor-said computer program is run by a computer.

16. A non-transitory digital storage medium having stored thereon processor-executable instructions to perform the method of claim 14
when the processor-executable instructions are executed by a processor.

* * * * *